(12) United States Patent
Khattab et al.

(10) Patent No.: US 12,535,606 B2
(45) Date of Patent: Jan. 27, 2026

(54) SEISMIC INVERSION DOWNSCALING AND EXTRAPOLATION FOR GENERATION OF SEISMIC IMAGES

(71) Applicant: Saudi Arabian Oil Company, Dhahran (SA)

(72) Inventors: Sherif Khattab, Dhahran (SA); Muhammad Ashraf, Al Khobar (SA)

(73) Assignee: Saudi Arabian Oil Company, Dhahran (SA)

( * ) Notice: Subject to any disclaimer, the term of this patent is extended or adjusted under 35 U.S.C. 154(b) by 449 days.

(21) Appl. No.: 18/084,148

(22) Filed: Dec. 19, 2022

(65) Prior Publication Data

US 2024/0201405 A1    Jun. 20, 2024

(51) Int. Cl.
*G01V 1/28*    (2006.01)
*G01V 1/30*    (2006.01)
(Continued)

(52) U.S. Cl.
CPC .............. *G01V 1/282* (2013.01); *G01V 1/306* (2013.01); *G01V 1/345* (2013.01); *G06T 17/05* (2013.01);
(Continued)

(58) Field of Classification Search
CPC ........ G01V 1/282; G01V 1/306; G01V 1/345; G01V 2210/6226; G01V 2210/64; G06T 17/05; G06T 2200/24
See application file for complete search history.

(56) References Cited

U.S. PATENT DOCUMENTS 8,775,142 B2    7/2014    Liu et al.
10,656,295 B2    5/2020    Rodriguez-Herrera et al.
(Continued)

FOREIGN PATENT DOCUMENTS

AU    2011256799 A1 * 11/2012    ............. G01V 1/001
CA    2947581 C * 12/2021    ............. G01V 1/303
(Continued)

OTHER PUBLICATIONS

Foreign patent corresponding to AU 2011256799 A (Year: 2011).*
(Continued)

*Primary Examiner* — Elias Desta
(74) *Attorney, Agent, or Firm* — Fish & Richardson P.C.

(57) ABSTRACT

Methods for seismic imaging of a subterranean geological formation include receiving first acoustic impedance data, having a first resolution, associated with wells in a subsurface region. A system receives seismic data including second acoustic impedance data having a second resolution. The system performs a quality control process configured to identify a mismatch between the first acoustic impedance data and the second acoustic impedance data. The system resamples the second acoustic impedance data into a three-dimensional (3D) grid model. The system scales up the first acoustic impedance data into the 3D grid model. The system downscales the second acoustic impedance data controlled by the first acoustic impedance data in the 3D grid model. The system generates third acoustic impedance data representing fine-scale impedance data. The system extrapolates the fine-scale impedance into areas or regions having no seismic data coverage or poor seismic data coverage.

20 Claims, 19 Drawing Sheets

(51) Int. Cl.
    *G01V 1/34*     (2006.01)
    *G06T 17/05*     (2011.01)

(52) U.S. Cl.
    CPC ............ *G01V 2210/6226* (2013.01); *G01V 2210/64* (2013.01); *G06T 2200/24* (2013.01)

(56) References Cited

U.S. PATENT DOCUMENTS

| | | | |
|---|---|---|---|
| 11,099,289 B2 * | 8/2021 | Dev | G06Q 10/06 |
| 11,965,996 B2 * | 4/2024 | Daghistani | G01V 1/282 |
| 2010/0185422 A1 | 7/2010 | Hoversten | |
| 2015/0009215 A1 | 1/2015 | Vallikkat Thachaparambil et al. | |
| 2020/0233110 A1 | 7/2020 | Chaudhuri | |
| 2022/0373703 A1 * | 11/2022 | Bekara | G01V 1/301 |

FOREIGN PATENT DOCUMENTS

| | | |
|---|---|---|
| CN | 106291677 | 10/2018 |
| WO | WO 2021143406 | 7/2021 |

OTHER PUBLICATIONS

Foreign patent corresponding to CA 2947581 (Year: 2014).*
Abdel-Fattah et al., "Integrated seismic attributes and stochastic inversion for reservoir characterization: Insights from Wadi field (NE Abu-Gharadig Basin, Egypt), " Journal of African Earth Sciences, Oct. 2019, 14 pages.
International Search Report and Written Opinion in International Appln No. PCT/US2023/083385, dated Apr. 19, 2024, 17 pages.

* cited by examiner

SEISMIC INVERSION DOWNSCALING AND EXTRAPOLATION FOR GENERATION OF SEISMIC IMAGES

TECHNICAL FIELD

The present disclosure generally relates to seismic attributes for reservoir characterization. Specifically, this application relates to models for improving seismic attributes data coverage in a geological region.

BACKGROUND

In geology, sedimentary facies are bodies of sediment that are recognizably distinct from adjacent sediments that resulted from different depositional environments. Generally, geologists distinguish facies by aspects of the rock or sediment being studied. Seismic facies are groups of seismic reflections whose parameters (such as amplitude, continuity, reflection geometry, and frequency) differ from those of adjacent groups. Seismic facies analysis, a subdivision of seismic stratigraphy, plays an important role in hydrocarbon exploration and is one key step in the interpretation of seismic data for reservoir characterization. The seismic facies in a given geological area can provide useful information, particularly about the types of sedimentary deposits and the anticipated lithology.

In reflection seismology, geologists and geophysicists perform seismic surveys to map and interpret sedimentary facies and other geologic features, for example, identification of potential petroleum reservoirs. Seismic surveys are conducted by using a controlled seismic source (for example, a seismic vibrator or dynamite) to create a seismic wave. The seismic source is typically located at ground surface. The seismic wave travels into the ground, is reflected by subsurface formations, and returns to the surface where it is recorded by sensors called geophones. The geologists and geophysicists analyze the time it takes for the seismic waves to reflect off subsurface formations and return to the surface to map sedimentary facies and other geologic features. This analysis can also incorporate data from sources, for example, borehole logging, gravity surveys, and magnetic surveys.

One approach to this analysis is based on tracing and correlating along continuous reflectors throughout the dataset produced by the seismic survey to produce structural maps that reflect the spatial variation in depth of certain facies. These maps can be used to identify impermeable layers and faults that can trap hydrocarbons such as oil and gas.

SUMMARY

This disclosure describes systems and methods for seismic inversion downscaling and extrapolation for generation of seismic images. The data processing system performs each of a downscaling process and an extrapolation process, as subsequently described. The data processing system performs the downscaling workflow to have an impedance vertical resolution at a fine-scale (e.g., a grid model scale) that is consistent with the optimal seismic scale impedance cube and conditioned to high frequency well data. The data processing system performs the extrapolation workflow to predict the acoustic impedance into the areas with no seismic coverage or low-quality seismic data.

The described implementations can provide various technical benefits. The stochastic model can enable extrapolation of high-quality seismic data to regions in which low-quality seismic signals are measurable. For example, inversion extrapolation can be guided by well impedance data in an area with no seismic coverage. A global distribution function of the seismic inversion cube can be used for extrapolation (e.g., of up to hundreds of meters from the wells). The extrapolation can be performed after a downscaling process or can be a standalone process performed on fine and/or coarse scale seismic inversions.

The extrapolation process can be performed for any grid model property. The extrapolation and downscaling techniques described in this specification assist in seismic exploration and/or drilling for hydrocarbons. For example, the process can include drilling well based on seismic images generated from the extrapolated seismic data. The improved data quality can help guide drilling processes, leading to lower costs and better outcomes of well placement.

The downscaled inversion improves the porosity model and the permeability model because the downscaled inversion captures far more vertical and lateral details compared to the inversion at seismic scale. The porosity and permeability models based on downscaled inversion provide a different lateral distribution for each grid layer (1-5 foot resolution). The inversion at the seismic scale gives the same image with a lateral distribution for an interval of 25-30 feet.

The systems and devices can include one or more of the following embodiments.

A process for seismic imaging of a subterranean geological formation includes receiving well logs including first acoustic impedance data associated with one or more wells in a subsurface region including the subterranean geological formation, the first acoustic impedance data having a first resolution; receiving seismic data, the seismic data including second acoustic impedance data having a second resolution that is different than the first resolution; performing a quality control process configured to identify a mismatch between the first acoustic impedance data and the second acoustic impedance data when the mismatch is present; resampling the second acoustic impedance data into a three-dimensional (3D) grid model that includes the subsurface region; scaling up the first acoustic impedance data into the 3D grid model; downscaling the second acoustic impedance data controlled by the first acoustic impedance data in the 3D grid model; generating, based on the first acoustic impedance data and the second acoustic impedance data in the 3D grid model, third acoustic impedance data representing fine-scale impedance data for one or more areas in the subsurface; and extrapolating the fine-scale impedance into areas or regions having no seismic data coverage or poor seismic data coverage.

In some implementations, the process includes drilling a well based on the third acoustic impedance data.

In some implementations, downscaling the second acoustic impedance data guided and controlled by the first acoustic impedance data in the 3D grid model comprises applying a sequential Gaussian simulation and a co-located simulation with optimal seismic scale impedance to the first acoustic impedance data and the second acoustic impedance data.

In some implementations, the process includes performing a trend quality control process on the second acoustic impedance data by performing operations comprising: extracting syncretic logs at a well level for a reservoir interval; comparing, over the reservoir interval, data of the syncretic logs at the well level to the first acoustic impedance data; and determining that a first one-dimensional (1D)

trend of the data of the syncretic logs of the second acoustic impedance comports with a second 1D trend of the first acoustic impedance data.

In some implementations, resampling comprises transforming values from the second acoustic impedance data on a nearest node basis into the 3D grid model.

In some implementations, the first resolution is 0.5 feet to 1 foot corresponding to a log data resolution, and wherein the second resolution is 25-30 feet, corresponding to a seismic data resolution.

In some implementations, the process includes rendering, based on the third acoustic impedance data, a seismic image for presentation on a user interface.

In some implementations, scaling up the first acoustic impedance data into the 3D grid model comprises a cell-based averaging of the first acoustic impedance data.

In a general aspect, a system for seismic imaging of a subterranean geological formation includes at least one processor; and a memory storing instructions that, when executed by the at least one processor, cause the at least one processor to perform operations comprising: receiving well logs including first acoustic impedance data associated with one or more wells in a subsurface region including the subterranean geological formation, the first acoustic impedance data having a first resolution; receiving seismic data, the seismic data including second acoustic impedance data having a second resolution that is different than the first resolution; performing a quality control process configured to identify a mismatch between the first acoustic impedance data and the second acoustic impedance data when the mismatch is present; resampling the second acoustic impedance data into a three-dimensional (3D) grid model that includes the subsurface region; scaling up the first acoustic impedance data into the 3D grid model; downscaling the second acoustic impedance data controlled by the first acoustic impedance data in the 3D grid model; generating, based on the first acoustic impedance data and the second acoustic impedance data in the 3D grid model, third acoustic impedance data representing fine-scale impedance data for one or more areas in the subsurface; and extrapolating the fine-scale impedance into areas or regions having no seismic data coverage or poor seismic data coverage.

In some implementations, the process includes drilling a well based on the third acoustic impedance data.

In some implementations, downscaling the second acoustic impedance data guided and controlled by the first acoustic impedance data in the 3D grid model comprises applying a sequential Gaussian simulation and a co-located simulation with optimal seismic scale impedance to the first acoustic impedance data and the second acoustic impedance data.

In some implementations, the operations include performing a trend quality control process on the second acoustic impedance data by performing operations comprising: extracting syncretic logs at a well level for a reservoir interval; comparing, over the reservoir interval, data of the syncretic logs at the well level to the first acoustic impedance data; and determining that a first one-dimensional (1D) trend of the data of the syncretic logs of the second acoustic impedance comports with a second 1D trend of the first acoustic impedance data.

In some implementations, resampling comprises transforming values from the second acoustic impedance data on a nearest node basis into the 3D grid model.

In some implementations, the first resolution is 0.5 feet to 1 foot corresponding to a log data resolution, and wherein the second resolution is 25-30 feet, corresponding to a seismic data resolution.

In some implementations, the operations include rendering, based on the third acoustic impedance data, a seismic image for presentation on a user interface.

In some implementations, scaling up the first acoustic impedance data into the 3D grid model comprises a cell-based averaging of the first acoustic impedance data.

In a general aspect, one or more non-transitory computer-readable media storing instructions for seismic imaging of a subterranean geological formation, the instructions, when executed by at least one processor, cause the at least one processor to perform operations comprising: receiving well logs including first acoustic impedance data associated with one or more wells in a subsurface region including the subterranean geological formation, the first acoustic impedance data having a first resolution; receiving seismic data, the seismic data including second acoustic impedance data having a second resolution that is different than the first resolution; performing a quality control process configured to identify a mismatch between the first acoustic impedance data and the second acoustic impedance data when the mismatch is present; resampling the second acoustic impedance data into a three-dimensional (3D) grid model that includes the subsurface region; scaling up the first acoustic impedance data into the 3D grid model; downscaling the second acoustic impedance data controlled by the first acoustic impedance data in the 3D grid model; generating, based on the first acoustic impedance data and the second acoustic impedance data in the 3D grid model, third acoustic impedance data representing fine-scale impedance data for one or more areas in the subsurface; and extrapolating the fine-scale impedance into areas or regions having no seismic data coverage or poor seismic data coverage.

In some implementations, the process includes drilling a well based on the third acoustic impedance data.

In some implementations, downscaling the second acoustic impedance data guided and controlled by the first acoustic impedance data in the 3D grid model comprises applying a sequential Gaussian simulation and a co-located simulation with optimal seismic scale impedance to the first acoustic impedance data and the second acoustic impedance data.

In some implementations, the operations include performing a trend quality control process on the second acoustic impedance data by performing operations comprising: extracting syncretic logs at a well level for a reservoir interval; comparing, over the reservoir interval, data of the syncretic logs at the well level to the first acoustic impedance data; and determining that a first one-dimensional (1D) trend of the data of the syncretic logs of the second acoustic impedance comports with a second 1D trend of the first acoustic impedance data.

In some implementations, resampling comprises transforming values from the second acoustic impedance data on a nearest node basis into the 3D grid model.

In some implementations, the first resolution is 0.5 feet to 1 foot corresponding to a log data resolution, and wherein the second resolution is 25-30 feet, corresponding to a seismic data resolution.

In some implementations, the operations include rendering, based on the third acoustic impedance data, a seismic image for presentation on a user interface.

In some implementations, scaling up the first acoustic impedance data into the 3D grid model comprises a cell-based averaging of the first acoustic impedance data.

In some implementations, the operations include downscaling the seismic inversion (acoustic impedance as an example), utilizing stochastic modeling technique to generate alternative realizations of fine-scale impedance models consistent with the optimal seismic scale impedance model, conditioned to high frequency well data and considering the scale difference between both information. In some implementations, the operations include extrapolating the acoustic impedance into the areas with no seismic coverage or low-quality seismic data due to the effect of soft sediments as seismic waves entering sediment-filled valleys, such as Wadi Area, can trap seismic energy such that it reverberates like sound in an echo chamber.

In some implementations, the operations include controlling, based on the extrapolation of the data, drilling equipment for generating a new well in the subterranean formation.

The details of one or more embodiments are set forth in the accompanying drawings and the description below. Other features and advantages will be apparent from the description and drawings, and from the claims.

DETAILED DESCRIPTION

Figure 1:
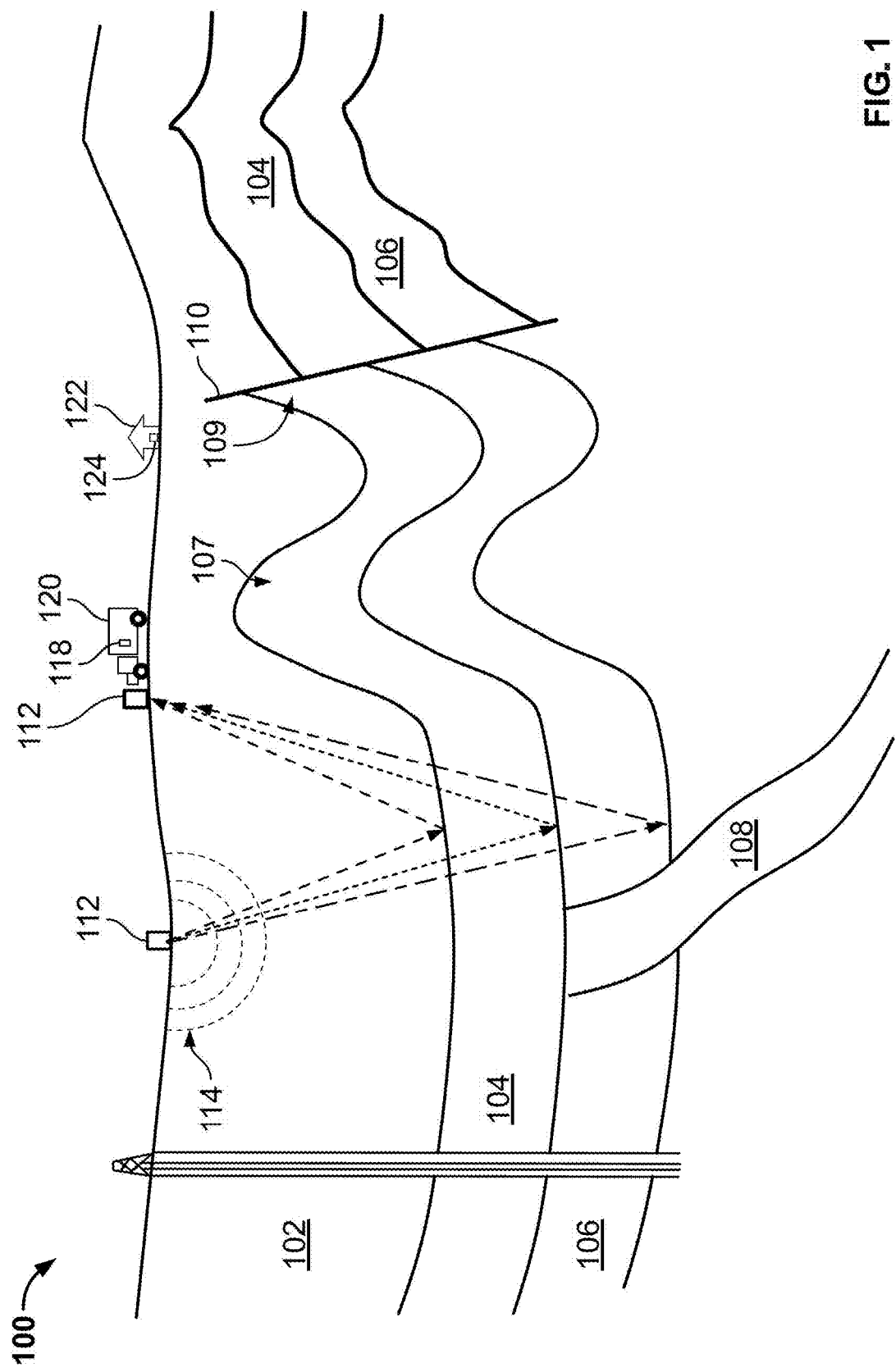
FIG. 1 is a schematic view of a seismic survey being performed to map subterranean features such as facies and faults.

Seismic images can be viewed as photographs for underground layers of rocks. These images can be formed from different probing elastic waves while various images can made from the echoes of these waves that reflect different rock properties. Generally, reflections and diffractions are the main seismic signal events providing subsurface information. Seismic imaging and inversion of reflections are the workflows in the industry to reveal subsurface geologic structure and stratigraphy and to generate rock properties for reservoir characterization.

This specification describes systems and processes configured to downscale a seismic inversion. To illustrate the process, a data processing system described in this document processes an acoustic impedance signal as an example. The data processing system is configured to execute a stochastic model to generate a set of alternative realizations of fine-scale impedance models. The fine-scale impedance models are in agreement with an optimal seismic scale impedance model. The fine-scale impedance model is conditioned to high-frequency well data. A consistency between the fine-scale impedance model and the optimal seismic scale impedance model can be shown when a scale difference between data of each model is considered. The data processing system uses a stochastic modeling process, subsequently described, to extrapolate an acoustic impedance measurement into subsurface areas that have no seismic coverage or are associated with low-quality seismic data. Low-quality seismic data can include sparse seismic data, noisy seismic data, and so forth. Quality of seismic data can be characterized by calculation of a Q-factor value for the seismic data. The Q-factor value includes a seismic signal attenuation factor, and represents a comparison of an attenuation of the seismic signal relative to random noise contaminating the seismic data. Low signal quality can be because of an effect of soft sediments as seismic waves enter sediment-filled valleys, such as a Wadi Area. These subsurface regions can trap seismic acoustic signals such that a signal can reverberate as if in an echo chamber.

The stochastic modeling technique described herein can enable extrapolation of the seismic signal. For example, inversion extrapolation can be guided by well impedance data in an area with no seismic coverage. A global distribution function of the seismic inversion cube can be used for extrapolation (e.g., of up to hundreds of meters from the wells). The extrapolation can be performed after a downscaling process or can be a standalone process performed on fine and/or coarse scale seismic inversions. The extrapolation process can be performed for any grid model property.

The stochastic modeling technique enables the extrapolation through the model update functionality of a stochastic run. A stochastic run includes an execution of the stochastic model processing steps using the seismic inversion data of the subsurface region as input data for the model. The data processing system updates the model for the stochastic run locally inside each polygon. A polygon defines a portion of the subsurface region over which there is no or low-quality seismic data and for which the seismic data is being extrapolated. The stochastic model is updated for a given region property and around specified wells based on the extrapolation process. For example, the performance of inversion extrapolation (subsequently described in relation to FIG. 12), by the data processing system, is guided by well impedance in a given area with no seismic coverage (as defined by a polygon). A global distribution function of an inversion cube (e.g., described in relation to FIG. 2) is utilized for extrapolation. In an example, a thickness of a band of cells around a boundary of the no coverage area (polygon) is defined to be 20 cells, where each cell is 100×100 meters and each have a 1-2 foot thickness. In some implementations, these cells are considered hard data to preserve a continuity of the updated area with its surroundings.

The data processing system subsequently described can perform extrapolation after downscaling process. The data processing system can also perform extrapolation as a standalone process that is performed on ether fine and/or coarse scale seismic inversion data. The data processing system can also perform extrapolation for any grid model property. The grid model properties can include physical rock properties such as density, porosity, permeability, and so forth.

The data processing system performs each of a downscaling process and an extrapolation process, as subsequently described. The data processing system performs the downscaling workflow to have an impedance vertical resolution at a fine-scale (e.g., a grid mole scale) that is consistent with the optimal seismic scale impedance cube and conditioned to high frequency well data. The data processing system performs the extrapolation workflow to predict the acoustic impedance into the areas with no seismic coverage or low-quality seismic data.

FIG. 1 is a schematic view of a seismic survey being performed to map subterranean features such as facies and faults in a subterranean formation 100. The seismic survey provides the underlying basis for implementation of the systems and methods described with reference to FIGS. 4-5. The subterranean formation 100 includes a layer of impermeable cap rocks 102 at the surface. Facies underlying the impermeable cap rocks 102 include a sandstone layer 104, a limestone layer 106, and a sand layer 108. A fault line 110 extends across the sandstone layer 104 and the limestone layer 106.

Oil and gas tend to rise through permeable reservoir rock until further upward migration is blocked, for example, by the layer of impermeable cap rock 102. Seismic surveys attempt to identify locations where interaction between layers of the subterranean formation 100 are likely to trap oil and gas by limiting this upward migration. For example, FIG. 1 shows an anticline trap 107, where the layer of impermeable cap rock 102 has an upward convex configuration, and a fault trap 109, where the fault line 110 might allow oil and gas to flow along with clay material between the walls traps the petroleum. Other traps include salt domes and stratigraphic traps.

A seismic source 112 (for example, a seismic vibrator or an explosion) generates seismic waves 114 that propagate in the earth. The velocity of these seismic waves depends on several properties, for example, density, porosity, and fluid content of the medium through which the seismic waves are traveling. Different geologic bodies or layers in the earth are distinguishable because the layers have different properties and, thus, different characteristic seismic velocities. For example, in the subterranean formation 100, the velocity of seismic waves traveling through the subterranean formation 100 will be different in the sandstone layer 104, the limestone layer 106, and the sand layer 108. As the seismic waves 114 contact interfaces between geologic bodies or layers that have different velocities, the interfaces reflect some of the energy of the seismic wave and refracts some of the energy of the seismic wave. Such interfaces are sometimes referred to as horizons.

The seismic waves 114 are received by a sensor or sensors 116. Although illustrated as a single component in FIG. 1, the sensor or sensors 116 are typically a line or an array of sensors 116 that generate output signals in response to received seismic waves including waves reflected by the horizons in the subterranean formation 100. The sensors 116 can be geophone-receivers that produce electrical output signals transmitted as input data, for example, to a computer 118 on a seismic control truck 120. In some implementations, the computer 118 can be in a building or other structure 122 that is remote from the subterranean formation. Based on the input data, the computer 118 may generate a seismic data output, for example, a seismic two-way response time plot. Generally, the computer 118 includes a seismic imaging system 250 described in relation to FIG. 5. The seismic imaging system 250 of the computer is configured to receive the seismic data from the sensors 116 and a velocity module of seismic waves 114 generated by the source(s) 112. The seismic imaging system is configured to generate a seismic image representing the path(s) of the seismic waves 114 through the subterranean formation 100, specifically with respect to near surface locations (less than 100 feet deep) in the formation.

A control center 122 can be operatively coupled to the seismic control truck 120 and other data acquisition and wellsite systems. The control center 122 may have computer facilities for receiving, storing, processing, and analyzing data from the seismic control truck 120 and other data acquisition and wellsite systems. In some implementations, the control center 122 includes the seismic imaging system 250. For example, computer systems 124 in the control center 122 can be configured to analyze, model, control, optimize, or perform management tasks of field operations associated with development and production of resources such as oil and gas from the subterranean formation 100. Alternatively, the computer systems 124 can be located in a different location than the control center 122. Some computer systems are provided with functionality for manipulating and analyzing the data, such as performing seismic interpretation or borehole resistivity image log interpretation to identify geological surfaces in the subterranean formation or performing simulation, planning, and optimization of production operations of the wellsite systems.

In some embodiments, results generated by the computer system 124 may be displayed for user viewing using local or remote monitors or other display units. One approach to analyzing seismic data is to associate the data with portions of a seismic cube representing the subterranean formation 100. The seismic cube can also be display results of the analysis of the seismic data associated with the seismic survey.

Seismic attributes are often considered a key tool to aid in the spatial identification of reservoir features and rock properties that may otherwise be difficult to ascertain from direct observation of the seismic amplitude cube. For example, a data processing system uses acoustic impedance data to determine rock porosity and to control a spatial distribution in 3D porosity modeling.

The data processing system can determine acoustic impedance data based on the acquired seismic data form the seismic survey. Acoustic impedance is a layer property of a rock and it is equal to the product of compressional velocity and density. Seismic traces are converted into pseudo-reflection-coefficient time series by appropriate initial processing, then into acoustic impedance by the inversion of the time series. Such pseudo-logs are roughly equivalent to logs recorded in wells drilled at every seismic trace location. The pseudo-logs include data that describes the subsurface rock and variations in rock lithology. To obtain the best quality pseudo-logs, the data processing system performs preprocessing of the seismic data such as true-amplitude recovery, appropriate deconvolution, common-depth-point (CDP) stack, wave-shaping, wave-equation migration, and amplitude scaling. The low frequencies from moveout velocity information are inserted. Both the short-period information computed from reflection amplitudes and the long-period trend computed from reflection moveout are displayed on acoustic impedance logs. Possible causes of pseudo-log distortions are inaccuracies of amplitude recovery and scaling, imperfection of deconvolution and migration, and difficulties of calibrating the pseudo-log to an acoustic log derived from well logs. Such calibration increases the precision. Facies variations observed in well logs can be extrapolated to large distances from the wells, leading to a more accurate estimation of hydrocarbon reserves.

Figure 2:
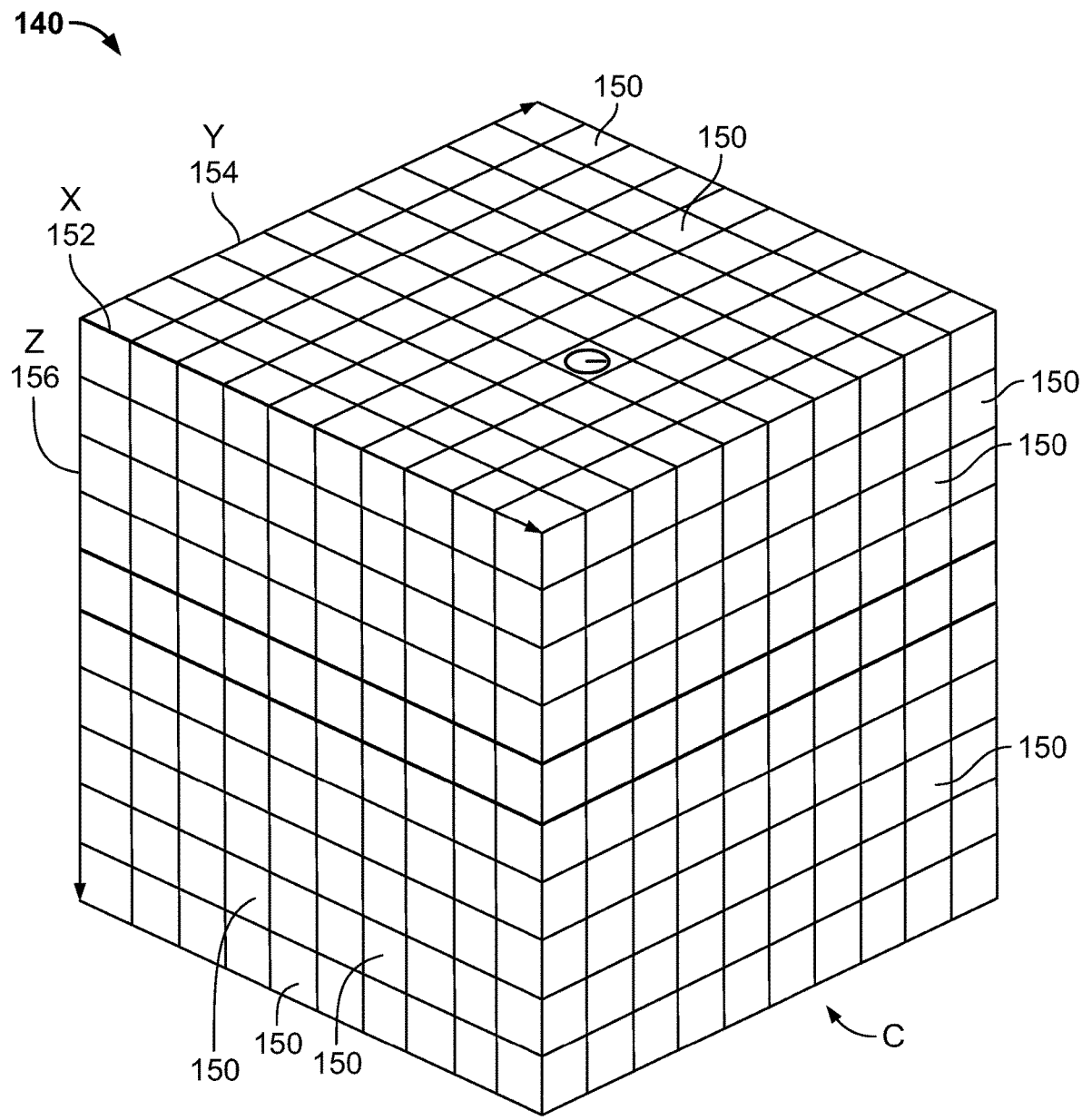
FIG. 2 illustrates a three-dimensional cube representing a subterranean formation.

FIG. 2 illustrates a seismic cube 140 representing at least a portion of the subterranean formation 100. The seismic cube 140 is composed of a number of voxels 150. A voxel is a volume element, and each voxel corresponds, for example, with a seismic sample along a seismic trace. The cubic volume C is composed along intersection axes of offset spacing times based on a delta-X offset spacing 152, a delta-Y offset spacing 154, and a delta-Z offset spacing 156. Within each voxel 150, statistical analysis can be performed on data assigned to that voxel to determine, for example, multimodal distributions of travel times and derive robust travel time estimates (according to mean, median, mode, standard deviation, kurtosis, and other suitable statistical accuracy analytical measures) related to azimuthal sectors allocated to the voxel 150. As subsequently described, the imaging condition of the seismic imaging system is configured to perform Hilbert transforms on the vertical delta-Z components of the seismic waves. The seismic cube 200 can be converted to represent acoustic data impendence data, as described in relation to FIG. 1.

Figure 3:
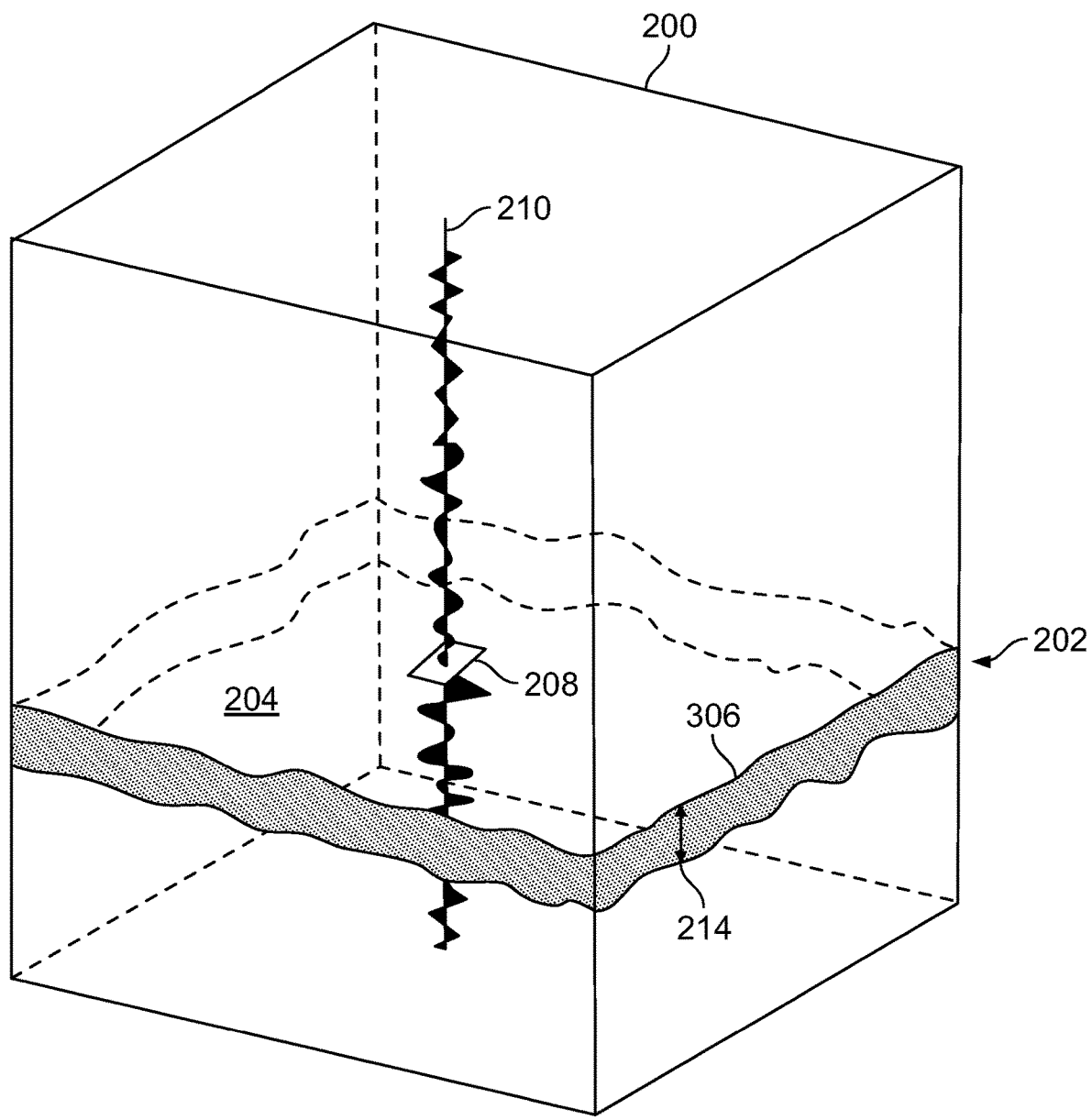
FIG. 3 illustrates a stratigraphic trace within the three-dimensional cube of FIG. 2.

FIG. 3 illustrates a seismic cube 200 representing a formation. The seismic cube has a stratum 202 based on a surface (for example, amplitude surface 204) and a stratigraphic horizon 206. The amplitude surface 204 and the stratigraphic horizon 206 are grids that include many cells such as exemplary cell 208. Each cell is a seismic trace representing an acoustic wave. Each seismic trace has an x-coordinate and a y-coordinate, and each data point of the trace corresponds to a certain seismic travel time or depth (t or z). For the stratigraphic horizon 206, a time value is determined and then assigned to the cells from the stratum 202. For the amplitude surface 204, the amplitude value of the seismic trace at the time of the corresponding horizon is assigned to the cell. This assignment process is repeated for all of the cells on this horizon to generate the amplitude surface 204 for the stratum 202. In some instances, the amplitude values of the seismic trace 210 within window 212 by horizon 206 are combined to generate a compound amplitude value for stratum 202. In these instances, the compound amplitude value can be the arithmetic mean of the positive amplitudes within the duration of the window, multiplied by the number of seismic samples in the window.

Figure 4:
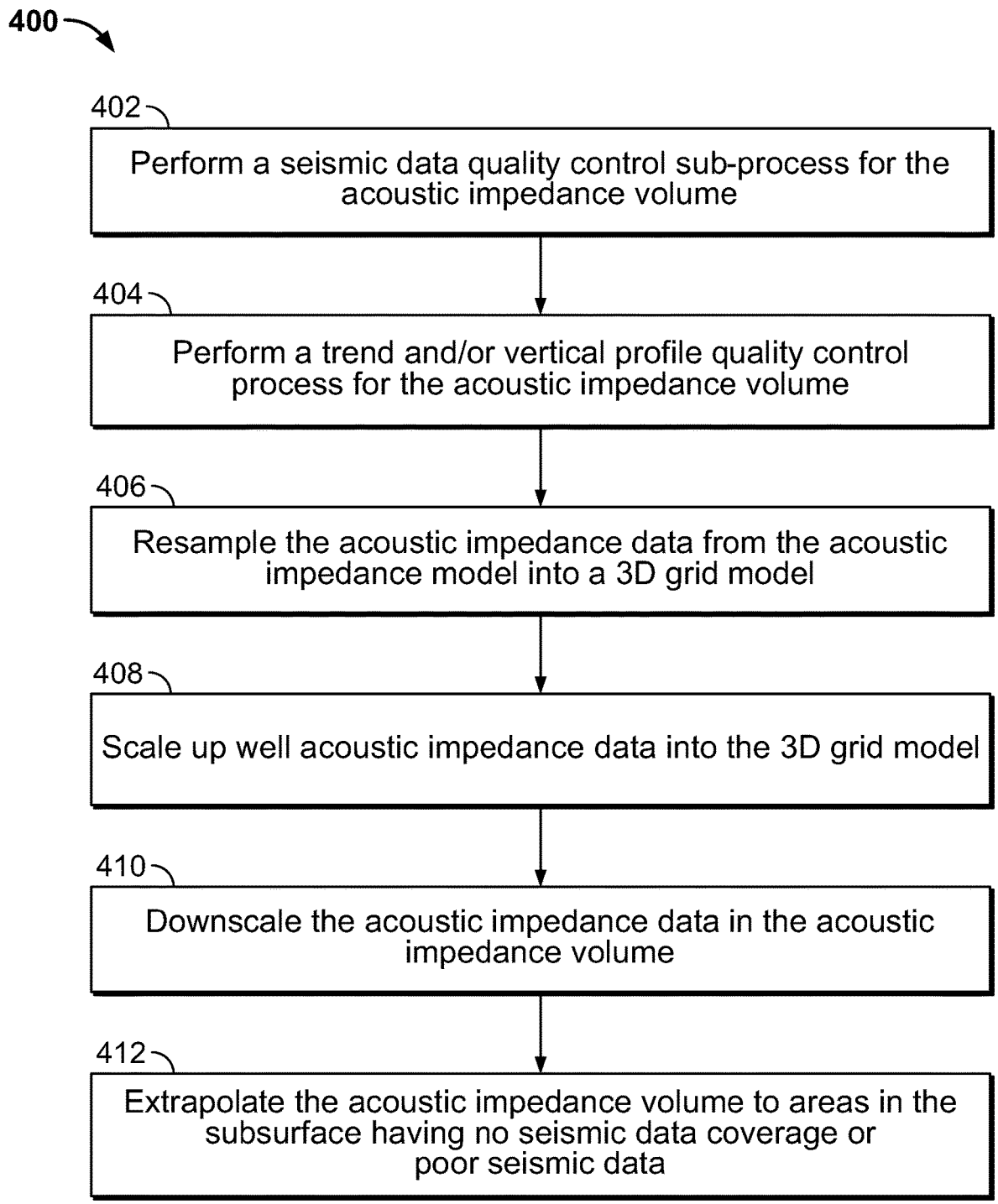
FIG. 4 illustrates a flow diagram including an example process for seismic inversion downscaling and extrapolation for generation of seismic images.
Figure 5:
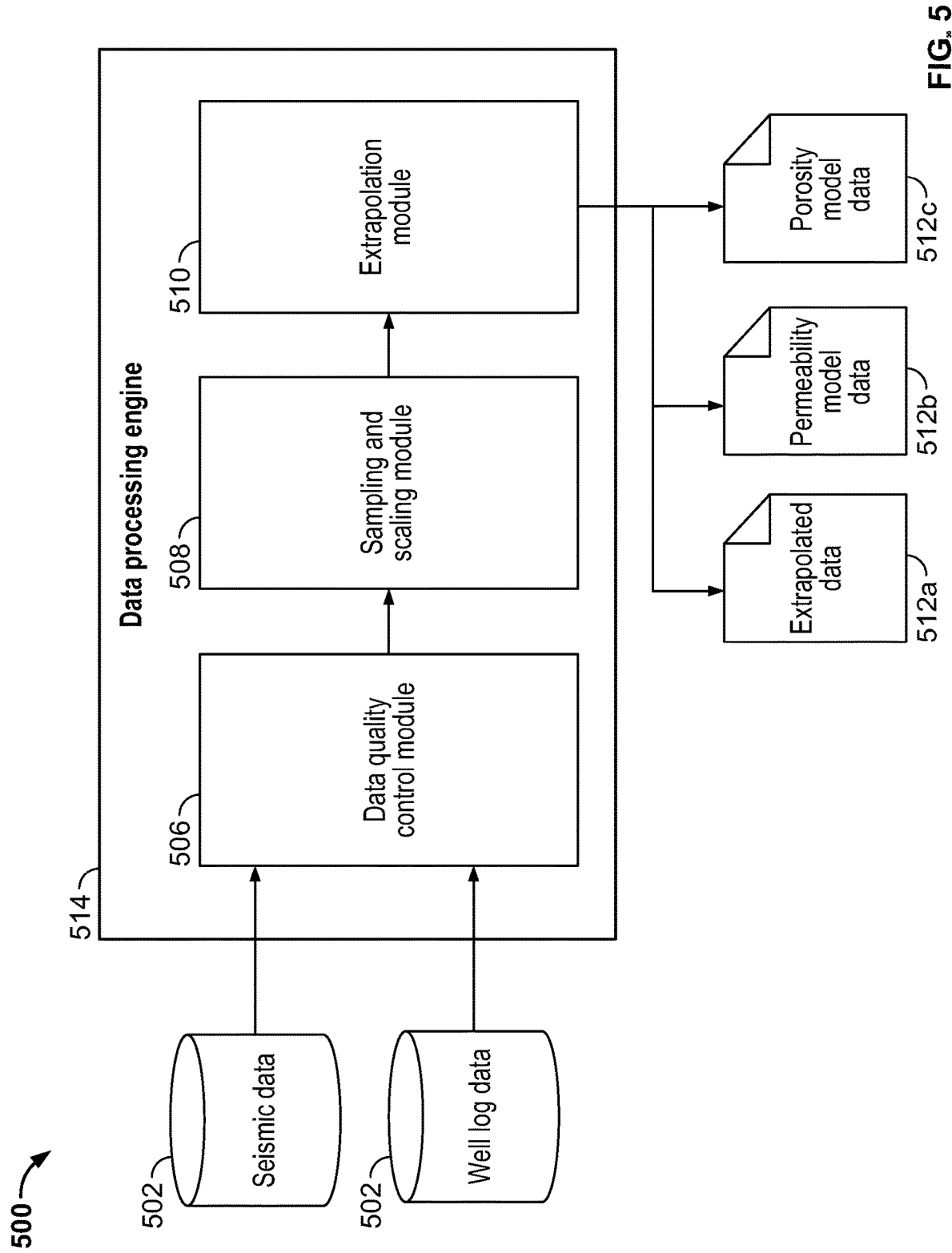
FIG. 5 is a block diagram of an example system for seismic inversion downscaling and extrapolation for generation of seismic images.

FIG. 4 illustrates a flow diagram including example process 400 performing seismic inversion operations. FIG. 5 shows a data processing system 500 for identifying geologic features in a subterranean formation using seismic diffraction imaging. The data processing system 500 is configured for performing the actions of process 400 of FIG. 4. The data processing system 500 includes a data processing engine 514 with a plurality of sub-modules that are configured for performing data processing actions for the data processing system 500. The modules include a data quality control module 506 for performing data quality control operations. The modules include a sampling and scaling module 508 for performing up-scaling, downscaling, and resampling operations. The modules include an extrapolation module 510 for performing data extrapolation operations. In some implementations, these modules are combined into a single module for performing the operations of process 400.

The data processing engine 514 is configured to receive data including seismic data 502 from seismic measurements, such as those described in relation to FIG. 1. The data processing engine 514 is configured to receive well data including well logs 504. The well data and the seismic data can each be transformed to represent acoustic impedance data.

The data processing engine 514 is configured to generate output data 512. The output data include extrapolated data 512a for the subsurface region, as subsequently described. The output data include a permeability model 512b, as subsequently described. The output data include porosity model data 512c, as subsequently described. In some implementations, intermediate data are generated for generating output data 512. The intermediate date include resampled data, up-scaled acoustic impedance data, downscaled acoustic impedance data, and so forth as subsequently described.

Turning to FIG. 4, a process 400 is performed by the data processing system 500 once seismic data are acquired by a physical acquisition system (such as a part of system described in relation to FIG. 1). One or more sources (such as source 112 of FIG. 1) are excited to generate a seismic signal in the formation 100. The seismic signal is propagated through subterranean formation 100 and recorded at receiver(s) (such as source 116 of FIG. 1). Generally, the seismic signal is propagated near the surface of the formation 100. Once the seismic data are received, the seismic data are converted to acoustic impedance data, as previously described, the data processing system performs a seismic inversion process 400.

The seismic inversion process 400 generates an optimal acoustic impedance model that is consistent with a static model cellular framework. In some conventional models, a seismic inversion process generates an acoustic impedance model that has a seismic vertical scale of 25-30-foot resolution. This resolution is not consistent with a static model cellular framework of 1-5 feet as an average vertical resolution. The seismic inversion process 400 includes a stochastic modeling process to downscale the seismic acoustic data and generate multiple alternative realizations of fine-scale impedance models that are each consistent with the optimal seismic scale impedance model. The fine-scale impedance models are each conditioned to high-frequency well data. The fine-scale impedance models accommodate a scale difference between optimal seismic scale impedance data and the well data.

The seismic inversion process 400 includes extrapolating acoustic impedance data into additional subsurface areas. The additional subsurface areas include areas for which there are no seismic measurements of the subsurface. The additional subsurface areas include areas for which there are low-quality seismic data. Low-quality seismic data, which include seismic data with a Q-factor that does not satisfy a threshold, can occur because of soft sediment areas that attenuate seismic signals. For example, soft sediment areas include sediment-filled valleys, such as wadi areas. These areas can trap seismic signals (e.g., acoustic waves) such that the seismic signals reverberate and dissipate in the region.

The seismic inversion process 400 includes the following actions. The process 400 includes executing (402), by the data processing system 500, a seismic data quality control sub-process for the acoustic impedance volume. The process 400 includes executing (404), by the data processing system 500, a trend and/or vertical profile quality control process for the acoustic impedance volume. The process 400 includes resampling (406), by the data processing system 500, the acoustic impedance data from the acoustic impedance model into a 3D grid model. The process 400 includes scaling up (408), by the data processing system 500, well acoustic impedance data into the 3D grid model. The process 400 includes downscaling (410), by the data processing system 500, the acoustic impedance data in the acoustic impedance volume. The process 400 includes extrapolating (412), by the data processing system 500, the acoustic impedance volume to areas in the subsurface having no seismic data coverage or poor seismic data. The data processing system 500 can perform a quality control sub-process on the results of process 400. Each of the actions of process 400 are subsequently described in further detail. The process 400 is configured to be performed as part of a 3D petrophysical modeling workflow. The process 400 can further include generating a seismic image based on the extrapolated acoustic impedance data for the subsurface region. The process 400 can include performing hydrocarbon exploration based on the generated seismic image. The exploration can include drilling into the subsurface to generate a well.

The data processing system 500 is configured to perform (402) a quality control process for the acoustic impedance volume. The quality control process is a part of the acoustic impedance data quality control. The data processing system 500 compares the impedance volume, in a depth domain, to a top of a 3D grid model in the same depth domain. The data processing system 500 ensures that there is no major data mismatch and no issues in a time to depth conversion for the acoustic impedance volume (cube). The data processing system 500 performs the quality control check prior to rescaling the acoustic impedance data into the 3D grid model. Generally, the data processing system 500 generates multiple in-lines and/or crosslines across an area of interest (e.g., the acoustic impedance volume representing a subsurface area). Examples of the top layer of the 3D grid model with the impedance volume in background are shown in FIGS. 6A-6C, subsequently described.

The quality control process is configured to identify issues in the time to depth conversion and mismatches between models. Tolerances for quality control can be a few feet in the depth domain between the top reservoir from the acoustic impedance cube and a top of a seismic reference horizon (e.g., a top reservoir) for the 3D geological model for the same geological marker. The major mismatch, which violates the tolerance, can be a result of applying different velocity models on time depth conversion for the acoustic impedance cube and the top of seismic reference horizon for 3D geological model.

Figure 6A:
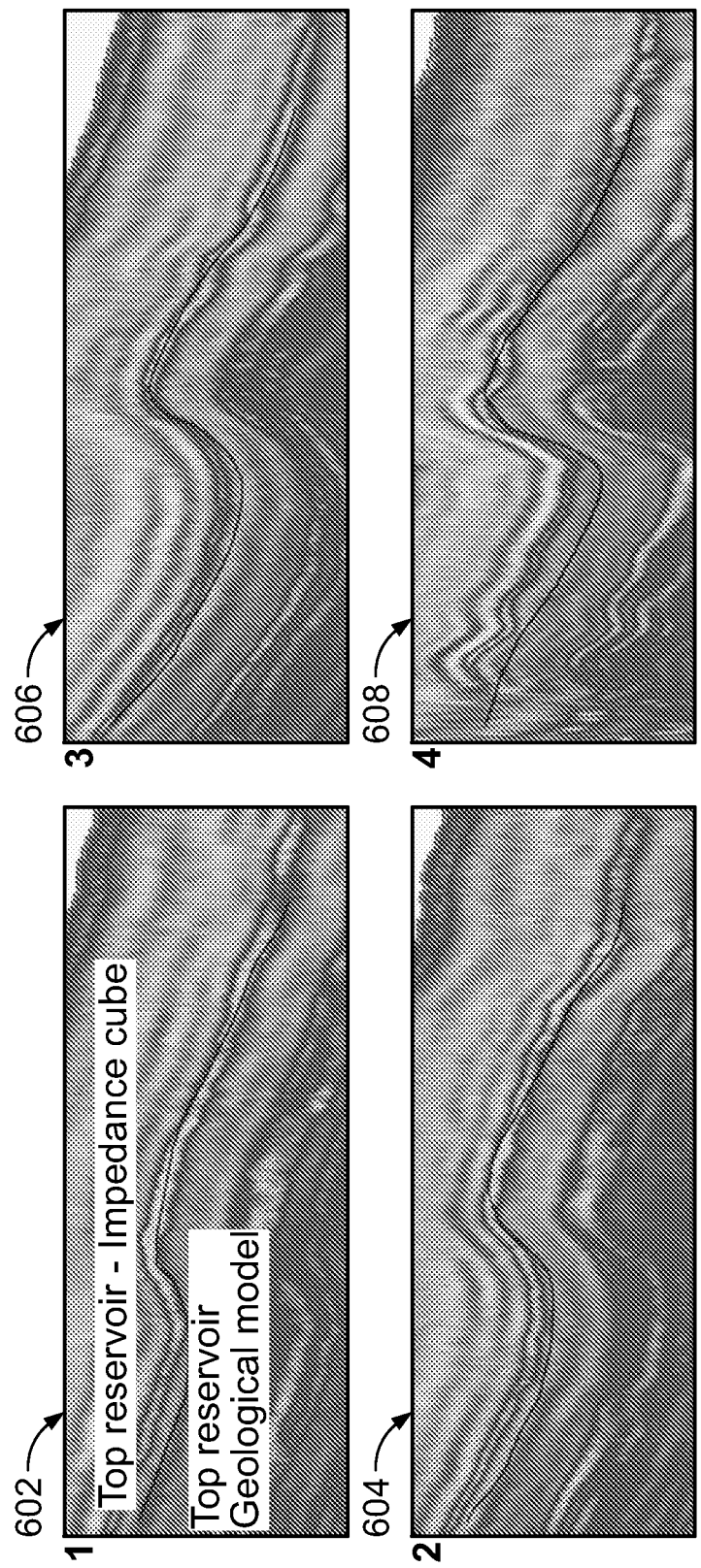
FIG. 6A shows example images of time to depth conversion for an acoustic impedance cube.
Figure 6B:
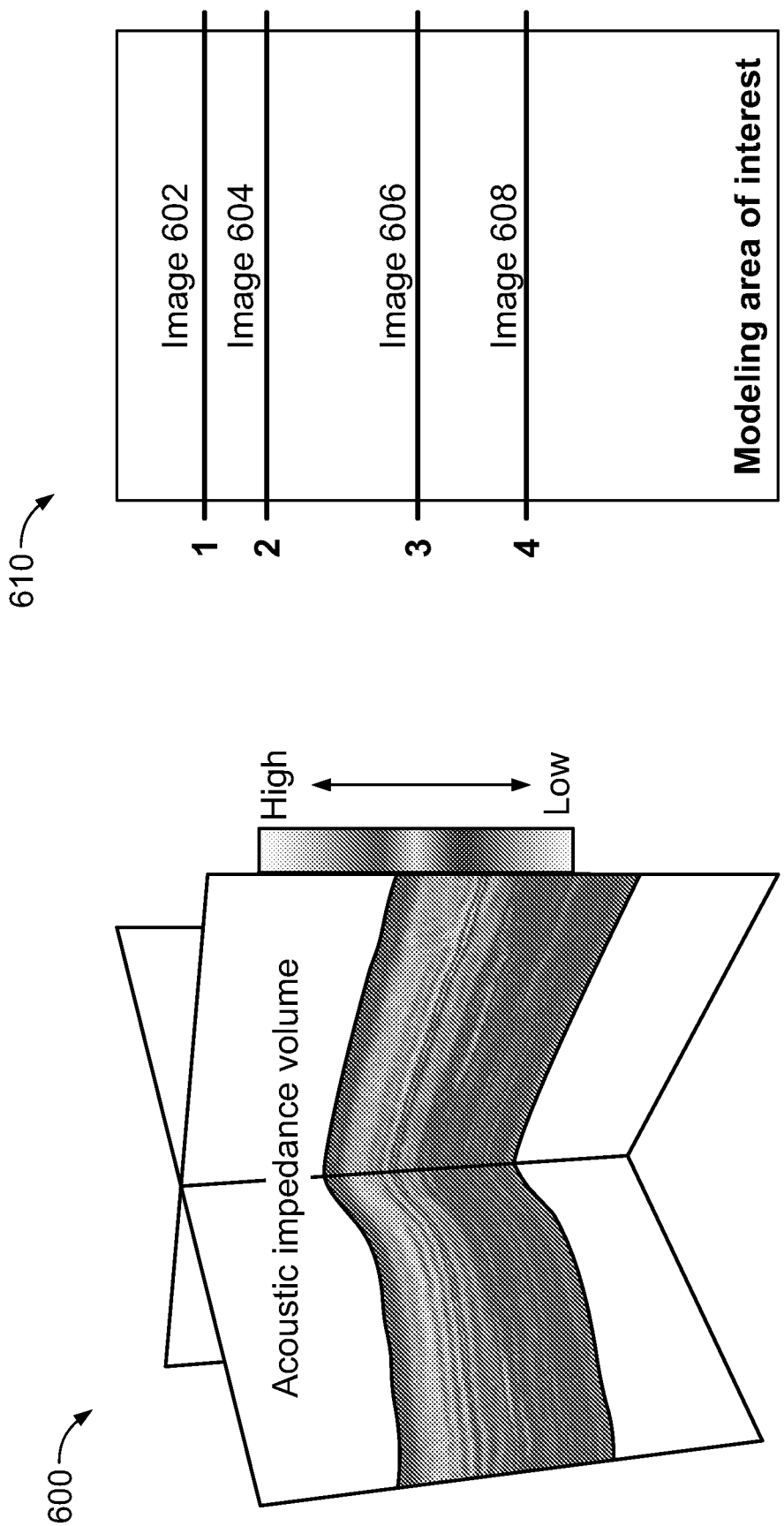
FIG. 6B shows an example of multiple in-lines created across the modeling area of interest from FIG. 6A.
Figure 6C:
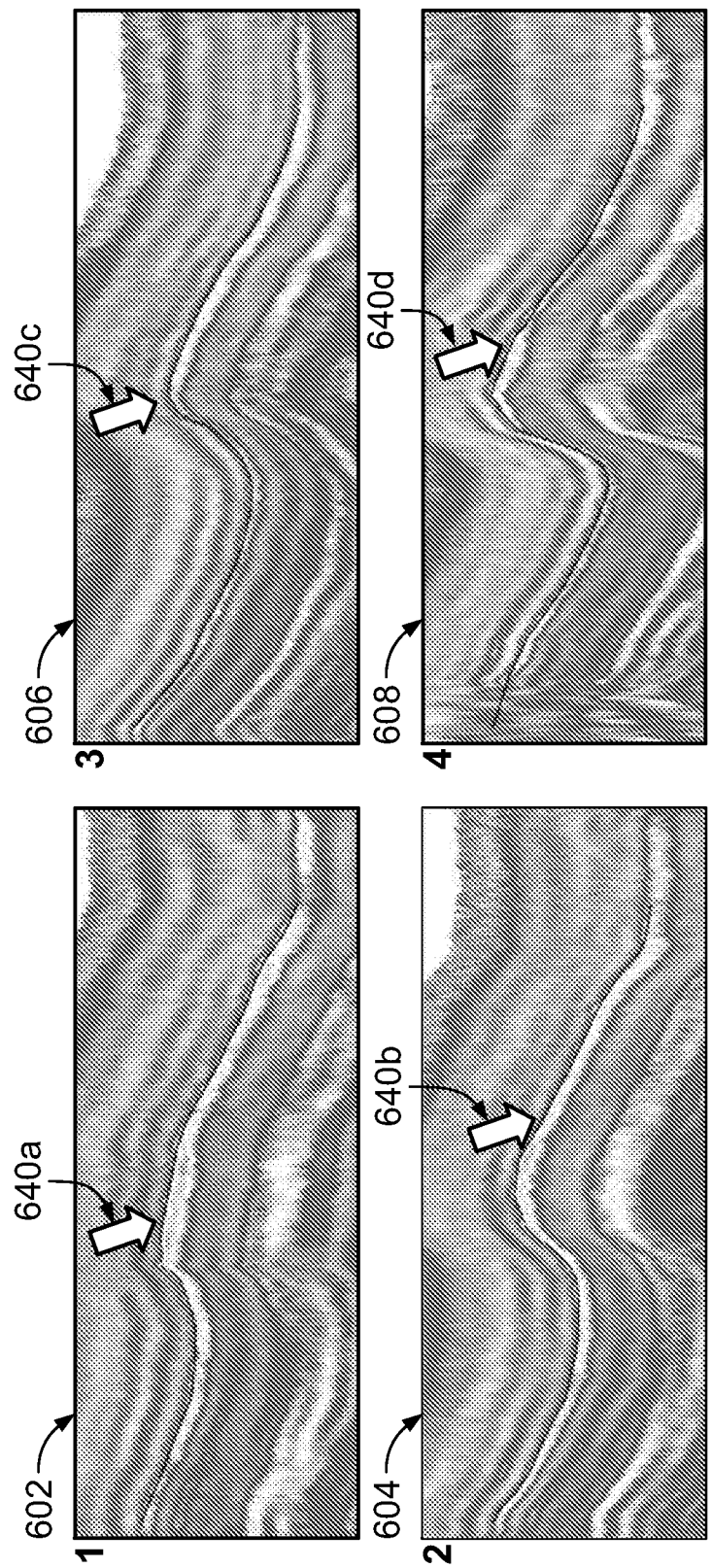
FIG. 6C shows example images of a top layer of a three-dimensional grid model of the acoustic impedance cube of FIG. 6A.

FIG. 6A shows example images of locations 602, 604, 606, and 608 in the subsurface volume, each image showing a time-to-depth conversion for an acoustic impedance volume 600 of FIG. 6B. FIG. 6A shows discrepancies between a top reservoir location 602 from the acoustic impedance cube and the top of the same reservoir from the 3D geological model, show in images of locations 604, 606, and 608. The discrepancies result from application of a different velocity model for the time-depth conversion for each data type of the 3D geological model. The discrepancy can be resolved by applying a same velocity model for the two data types, including the impedance and the seismic reference horizon of the top reservoir of at location 602, for the time-to-depth conversion. FIG. 6B shows an example of multiple in-lines created across a modeling area of interest 600 including the top reservoir 602 from FIG. 6A. The relative locations 602, 604, 606, and 608 of FIG. 6A are shown in a side-view 610 of the subsurface region. FIG. 6C shows example images of a top layer at location 602 and deeper locations 604, 606, and 608 of the three-dimensional grid models of the acoustic impedance volume 600 of FIG. 6B. FIGS. 6A and 6C show examples of resolved discrepancies between the two data types by using a same time-to-depth conversion process, highlighted by arrows 640a-d.

Figure 7:
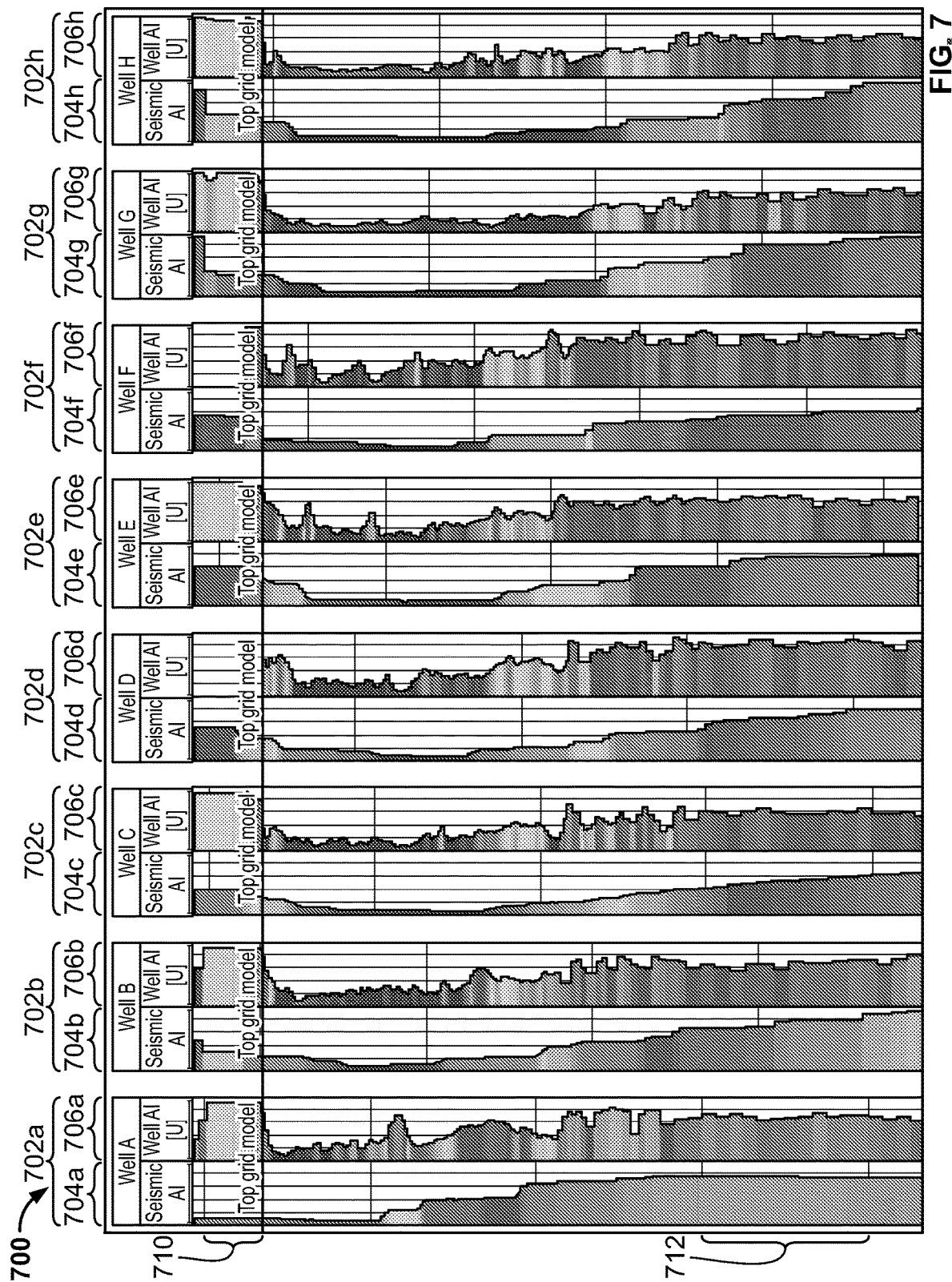
FIG. 7 shows an image illustrating an example of well data.

FIG. 7 shows an image illustrating an example of well data 700. The well data 700 includes a set of wells 702a-h (collectively wells 702) that are located in the subsurface region (e.g., volume 600 of FIG. 6B). The well data 700 include, for each well 702a-h, seismic data 704a-h including acoustic impedance determined from seismic data at the well location. For each well, the well data 700 include acoustic impedance data 706a-h that is based on measurements of well sensors at the well 702a-h.

The process 400 of FIG. 4 includes performing (404) a trend quality control process for acoustic impedance volume. The trend quality control process includes a second portion of the acoustic impedance quality assurance (e.g., of step 402). The data processing system 500 extracts syncretic logs 706a-h at a well level (e.g., per well or using well data) for a reservoir interval. For the reservoir, the data processing system 500 compares the well log data 706a-h against the well impedance measured by seismic data 704a-h. The data processing system 500 ensures that the impedance volume 600 comports with a same one-dimensional (1D) trend as a trend associated with the log data 706a-h representing well impedance. The data processing system 500 therefore ensures data consistency between the seismic data 704a-h and well data 706a-h because there are differences in vertical resolution between the two data types.

The well data 700 shows that the seismic impedance data 704a-h at well level is following a same trend as well impedance data 706a-h. Well data 700 show a low impedance at a top reservoir location 710 (which can correspond to image 602 of FIGS. 6A and 6C). Well data 700 show a gradual increase in impedance towards a base location 712.

A difference between seismic impedance data 704a-h at the well level and well impedance data 706a-h can include a vertical scale and/or vertical resolution of the data. Generally, a seismic vertical resolution of data 704a-h is 25-30 feet. Generally, a well impedance resolution of well data 706a-h is 0.5 feet. The well impedance data 706a-h represent an absolute value for acoustic impedance at wells 702a-h, while the seismic impedance data 704a-h give an average value for 25-30 feet. The well impedance values of data 706a-h are obtained from an acoustic impedance calculation. The acoustic impedance calculation is a product of porous media density (from a well density log of data 706a-h) through which the sound wave travels and the velocity of the sound wave (from a well sonic log of data 70-6a-h). The data represent the equation $Z=\rho V$, where $Z$ is the impedance, $\rho$ is the density of the material in the subsurface region, and $V$ is an acoustic velocity of the material in the subsurface region. Acoustic impedance is represented in units of Rayl, or kilograms per meters-squared*seconds $$\left(\frac{Kg}{m^2 s}\right).$$

Data processing system 500 performs the steps 402, 404 of process 400 to check a quality of seismic impedance volume before resampling into the 3D grid model and proceed with the downscaling/extrapolation processes subsequently described.

Figure 8:
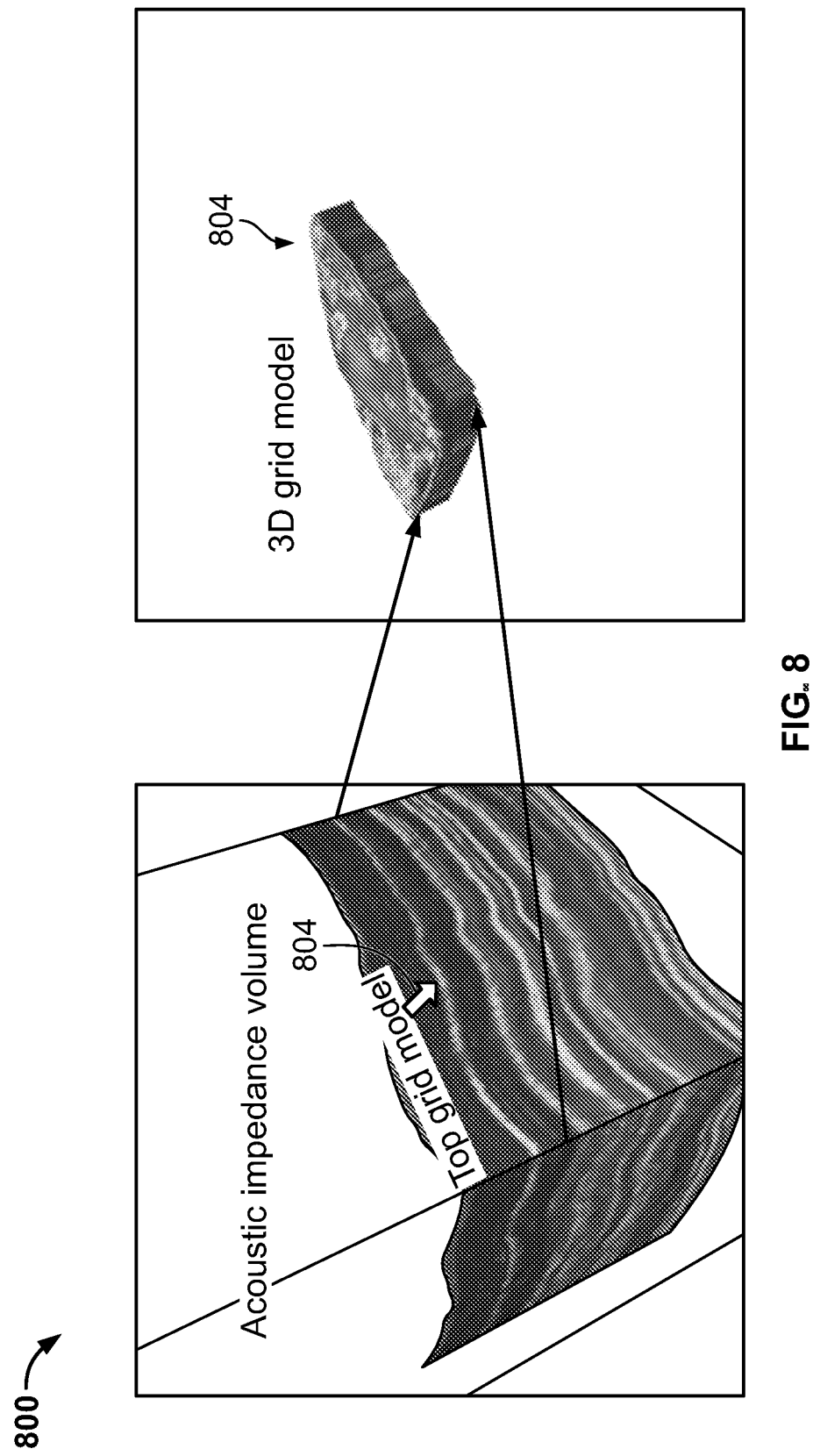
FIG. 8 shows an image illustrating an example of sampling from seismic data.

FIG. 8 shows an image of an acoustic impedance volume 800 illustrating an example of sampling from seismic data. A top grid model 802 (which can correspond to region 710 of FIG. 7 and/or model of location 602 of FIGS. 6A and 6C) is resampled (406), by the data processing system 500, from the seismic data (such as data 704a-h of FIG. The data processing system 500 resamples the seismic impedance into the 3D grid model 804. For sampling from seismic data, the data processing system 500 samples in a manner that is similar to sampling from a first grid parameter to a second grid parameter, except parameter types are the same but the data are from different sources and have different resolutions. Values from the acoustic impedance volume will be transferred on a nearest node basis into the 3D grid model. FIG. 8 shows how a seismic data set of model 800 is sampled onto a grid model parameter in the 3D grid model 804.

Figure 9:
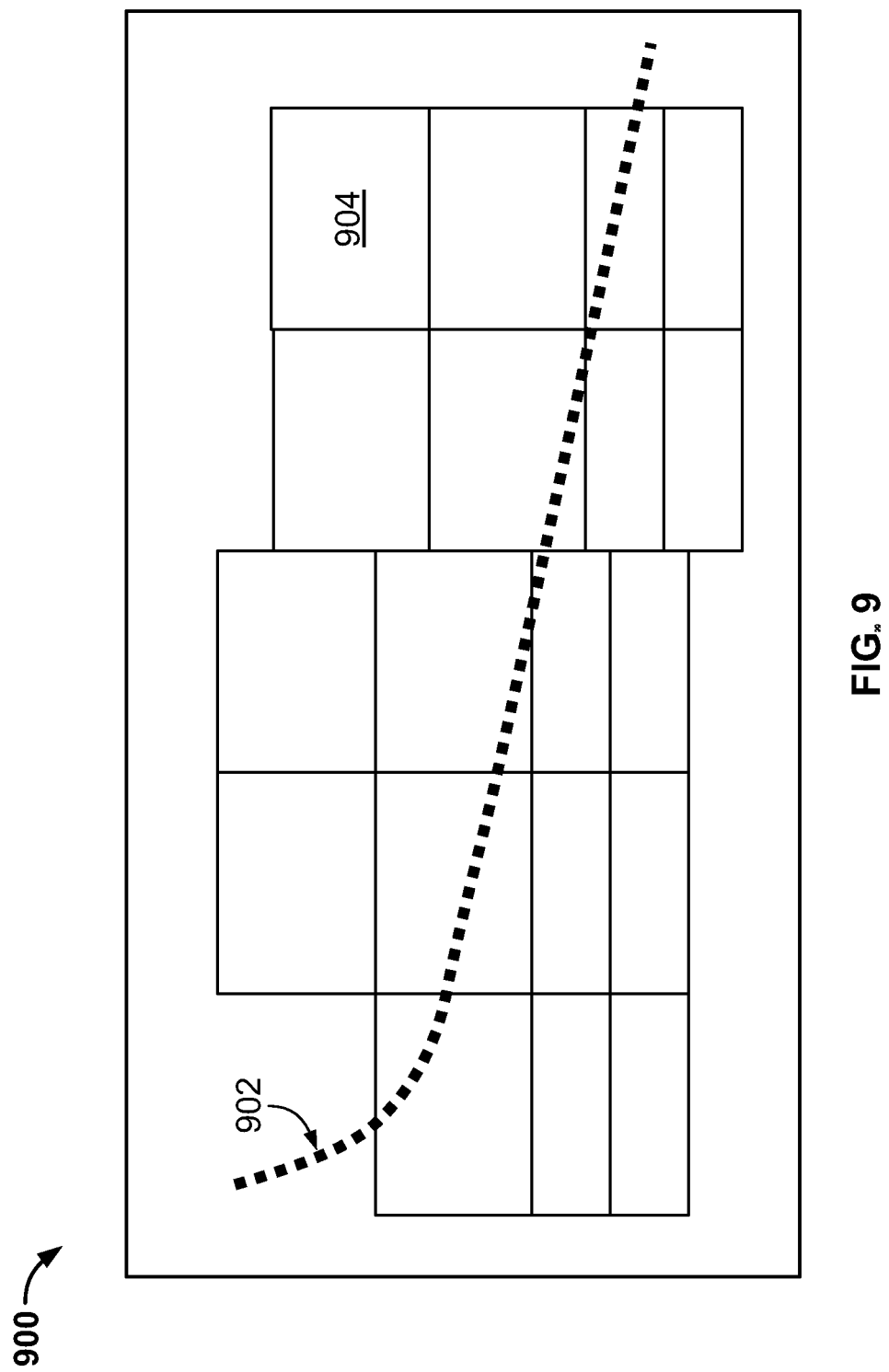
FIG. 9 shows an image illustrating an example of well data density in a 3D grid layout.

FIG. 9 shows a representation illustrating an example of well data density in a 3D grid layout of a subsurface 900. The data processing system 500 is configured to scale up (408) the well acoustic impedance into the 3D grid model, as described in relation to process 400. The data processing system 500 performs stochastic modeling using a 3D grid cell structure to represent the value distribution within the grid model volume. Each cell (such as cell 904 of subsurface 900) represents one value corresponding to the subject physical property, wherein the physical property includes an impedance value for that position in the 3D grid. Because well logs are generally measured every half foot, the cell 904 thickness in a 3D grid of the subsurface 900 is generally greater than the well data sample density, shown by well data points 902. Accordingly, the data processing system 500 scales up the well data to the resolution of the 3D grid layout. For example, well logs like density logs and sonic logs are measured every half foot. The cell 904 thickness in a 3D grid is normally greater than the well data sampling (2-4 feet). The data processing system 500 scales up the well data (impedance data) into the 3D grid model for transferring the data from log scale into the grid model scale to be ready for the modeling algorithm (stochastic modeling) to perform the distribution throughout the reservoir in 3D space.

The data processing system 500 prepares the data for stochastic models. Observations of well data physical properties in a reservoir, such as acoustic impedance, are obtained from well data. The stochastic modeling enables the data processing system 500 to generate realistic distribution and/or descriptions of a physical property (impedance) throughout the reservoir, based on the input data and a data representing impedance trends and distributions in the subsurface region.

The data processing system 500 sets the parameters upscaling/downscaling based on results from the stochastic modeling engine. Stochastic models are performed using a 3D grid cell structure to represent the value distribution within the grid model volume. For example, the data processing system 500 performs the process of transferring the data from log scale into the grid model scale at well locations is upscaling where the log vertical resolution is 0.5 feet while the grid model resolution is 2-4 feet. In another example, the data processing system 500 performs the process of transferring the impedance from seismic scale (resolution of 25-30 feet) into the grid model scale (resolution of 2-4 feet). The data processing system 500 performs downscaling where the stochastic modeling is utilized to generate alternative realizations of fine-scale impedance models consistent with the optimal seismic scale impedance model, conditioned to high frequency well data, which represents well impedance.

Figure 10:
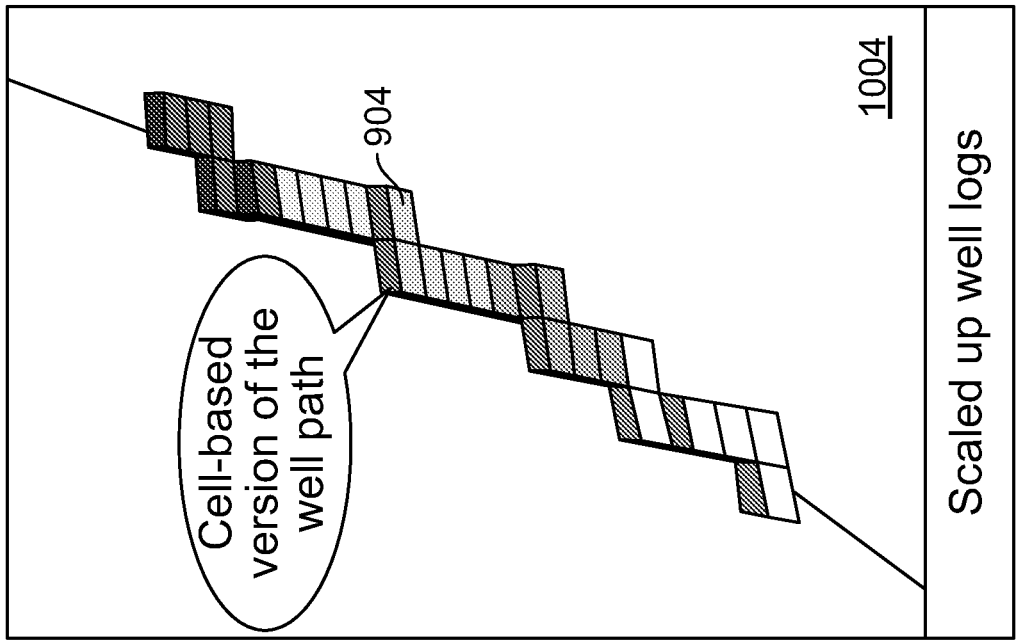
FIG. 10 shows an image illustrating an example of well logs.
Figure 10:
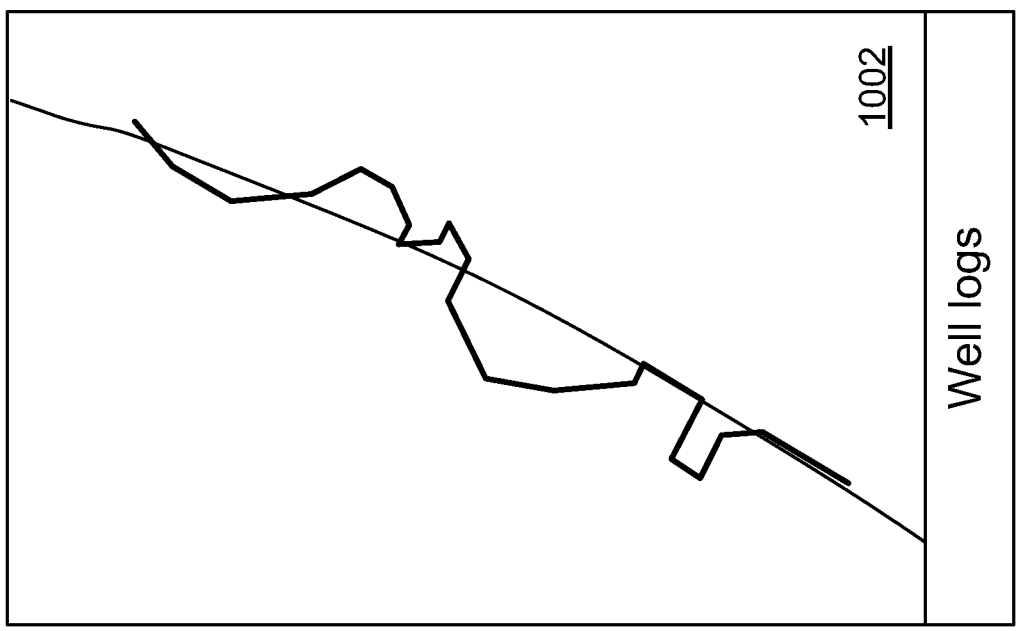

The data processing system 500 scales up the well logs by identifying each of the grid cells 902 that are penetrated by a well trajectory for well data 902. The data processing system 500 generates a cell-based version of the well path. FIG. 10 shows example images illustrating the scaling up process from a representation of the well log data 1002 to the scaled-up well log data 1004. The data processing system 500 scales up the well impedance log data belonging to each cell 904 that are penetrated by the well, which is represented by well data 902. In an example, the data processing system 500 performs the process of scaling up the well log data 1002 by applying an arithmetic averaging method. Each cell 904 is treated individually by the data processing system 500. The data processing system 500 generates an up-scaled value for each cell 904 depending on specified parameter settings. The examples of these specified parameter setting include averaging algorithms, reservoir units/sub units and grid layers. Each cell 904 in the grid model 1004 is treated individually. The well data samples located at this cell 904 can be averaged to be represented with one value inside the cell 904.

The data processing system 500 performs two processes including stochastic modeling. The first process includes downscaling a vertical resolution of the acoustic impedance volume (such as cube 600 of FIG. 6B). The data processing system 500 downscales the vertical resolution from a seismic scale of about 23-30 feet resolution to a grid model scale of about 1-5 feet resolution. The data processing system 500 performs a second process including extrapolating values of the acoustic impedance of the volume 600 to areas in the subsurface having no seismic coverage. The extrapolation is guided by well impedance logs (such as log data 706a-h of FIG. 7) and by specified cells (such as cells 904) near the area of extrapolation.

The data processing system 500 is configured to perform (410) a process to downscale the acoustic impedance data. This is a part of process 400 of FIG. 4. The data processing system 500 performs downscaling using a stochastic modeling-based process. The downscaling process includes downscaling the seismic scale acoustic impedance model and generating an alternative realization of an impedance model at the 3D grid model scale. The generated impedance model including fine-scale impedance models is consistent with the optimal seismic scale impedance model, as previously described. In some implementations, the data processing system 500 distributes the high-frequency well impedance data after scaling up these the 3D grid model. The data processing system 500 distributes the high-frequency impedance data in the 3D space of the modeling area using a sequential Gaussian simulation algorithm. The data processing system 500 models the well impedance in a co-located simulation with the optimal seismic scale impedance model.

The data processing system 500 performs downscaling as now described. For example, for a given set of acoustic values for neighboring cells, the data processing system 500 applies data transforms to downscale this from the 30 foot grid model to the 1 to 5 foot model using three parameters as follows. A first parameter includes a well impedance at well observations, where a vertical resolution is 0.5 feet. The second parameter is an acoustic impedance volume including seismic data, having a vertical resolution of 25-30 feet. A third parameter is a 3D grid model, having a vertical resolution of 1-5 feet. The 3D grid model represents a container in which the data processing system 500 performs the downscaling process. The well impedance is up-scaled into the 3D grid model to transfer the input data (the acoustic impedance values) from raw log resolution into the 3D grid model resolution. The data processing system 500 performs the input data transfer at well locations. The data processing system 500 uses an averaging method previously described to average values of samples located within a same grid cell. In some implementations, each grid model cell is represented by one value.

The data processing system 500 resamples the acoustic impedance volume from seismic data into the 3D grid model as a parameter or a property under the grid model. Sampling from seismic data is similar to sampling from one grid parameter to another. Values from seismic acoustic impedance cube are transferred on a nearest node basis into the 3D grid model.

The data processing system 500 performs downscaling by modeling the high-frequency well impedance data after it is transferred into the 3D grid model (at a 1-5 foot vertical resolution). The high frequency well impedance data are distributed in the 3D space of the modeling area using a sequential Gaussian simulation algorithm. The simulation is co-located with the simulation of the optimal seismic scale impedance (25-30 foot vertical resolution). The output of modeling process is the downscaled acoustic impedance at the grid model resolution The transform including the stochastic modeling of the well impedance in 3D space using sequential Gaussian simulation, and co-located simulation with optimal seismic scale impedance, enables at least the following advantages or new data to be generated. The transform includes a capability to generate alternative realizations of fine-scale impedance models that are consistent with the optimal seismic scale impedance, and conditioned to high frequency well data. The transform enables generation of a fine-scale impedance model that is conditioned to well data of a high number of wells if the fine-scale impedance model is not all compared to an optimal seismic scale acoustic impedance volume. The transform can reduce a processing overhead and output latency for hydrocarbon exploration, because the fine-scale impedance models do not need to be updated each time new wells are drilled and new logs data are available. The model covers areas of low data or no seismic coverage, because the data processing system performs data extrapolation as previously described.

In some implementations, values for the coefficients for the transform are defined from an x-plot between the well impedance data and the seismic impedance data, which are extracted as a synthetic log from the seismic volume at the well locations. Both data types are at a same resolution and/or vertical scale for determining the coefficient values.

Figure 11:
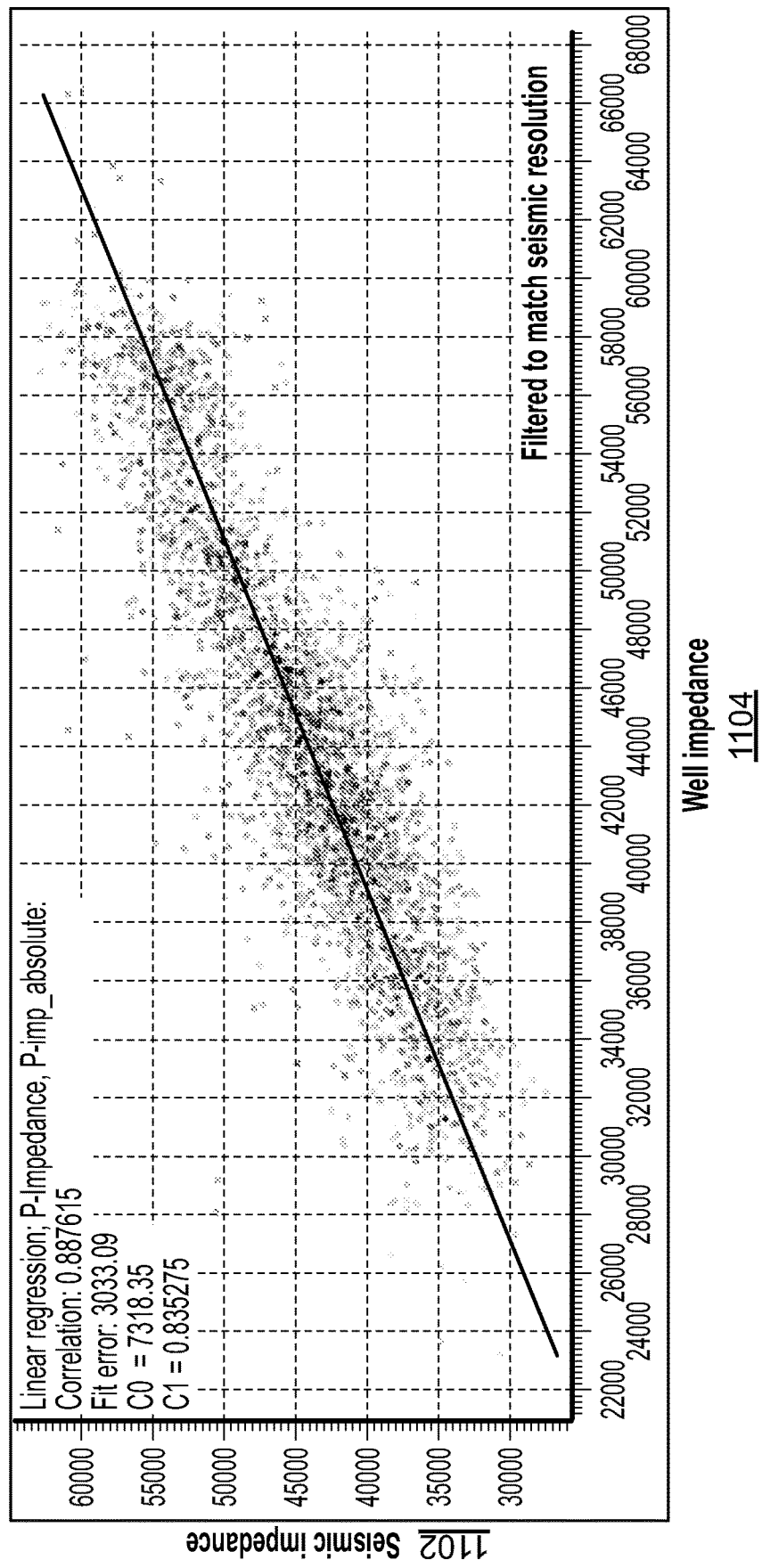
FIG. 11 shows a graph showing a relationship between well impedance and seismic impedance values.

FIG. 11 shows a graph 1100 showing a relationship between well impedance values 1104 and seismic impedance values 1102 for calculating coefficient values for the stochastic transform. The data processing system 500 performs (412) extrapolation after the downscaling process to ensure a realistic extrapolation is performed that is guided by more data samples. The data samples include a band of cells (such as cells 904) identified along the extrapolation boundary and well data impedance in the area with no seismic coverage to guide the extrapolation in 3D space. This extrapolation is not possible without these constraints (based on the scaled well data) to guide the extrapolation. For example, a last sample value from the area with acoustic impedance data can be extended as is to have a value all over the area with no coverage. In previous approaches, there was a blind extrapolation without this guidance. The constraints are defined such that a thickness of a band of cells around the boundary of the no-coverage area are defined to 10-20 cells. In some implementations, each cell is about 100×100 meters with a 1-2 foot thickness. These cells are considered as hard data to preserve a continuity of the updated area with its surroundings, in addition to the well data impedance in the area having no or poor seismic coverage. The coefficients of the transform are shown as C0 and C1 for these data.

The data processing system 500 applies co-located kriging and/or simulation when the relationship between primary and secondary parameters is described by a single, objective correlation value. The specified co-simulation parameter (seismic scale impedance) influences the result of the modeled petrophysical parameter (well impedance at the grid model scale). The fine-scale impedance parameter is affected by the seismic scale impedance parameter. The weight of influence in the petrophysical modeling is defined by the objective value of the correlation coefficient.

Figure 12:
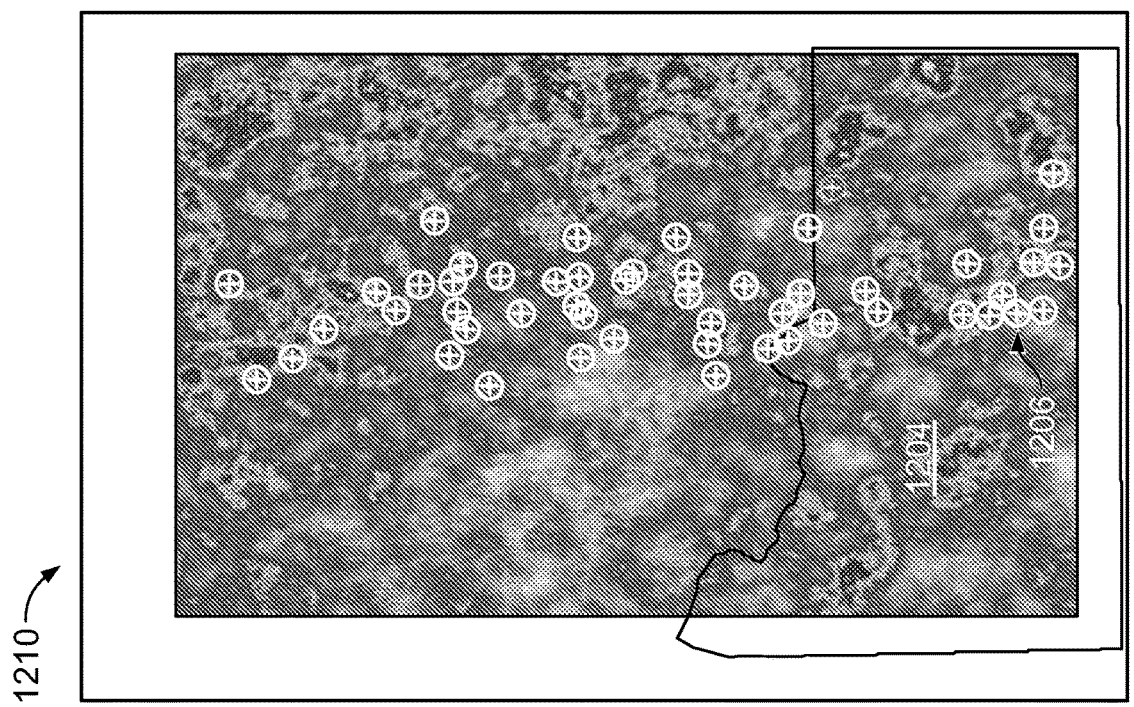
FIG. 12 shows images illustrating example data extrapolation for the acoustic impedance volume.
Figure 12:
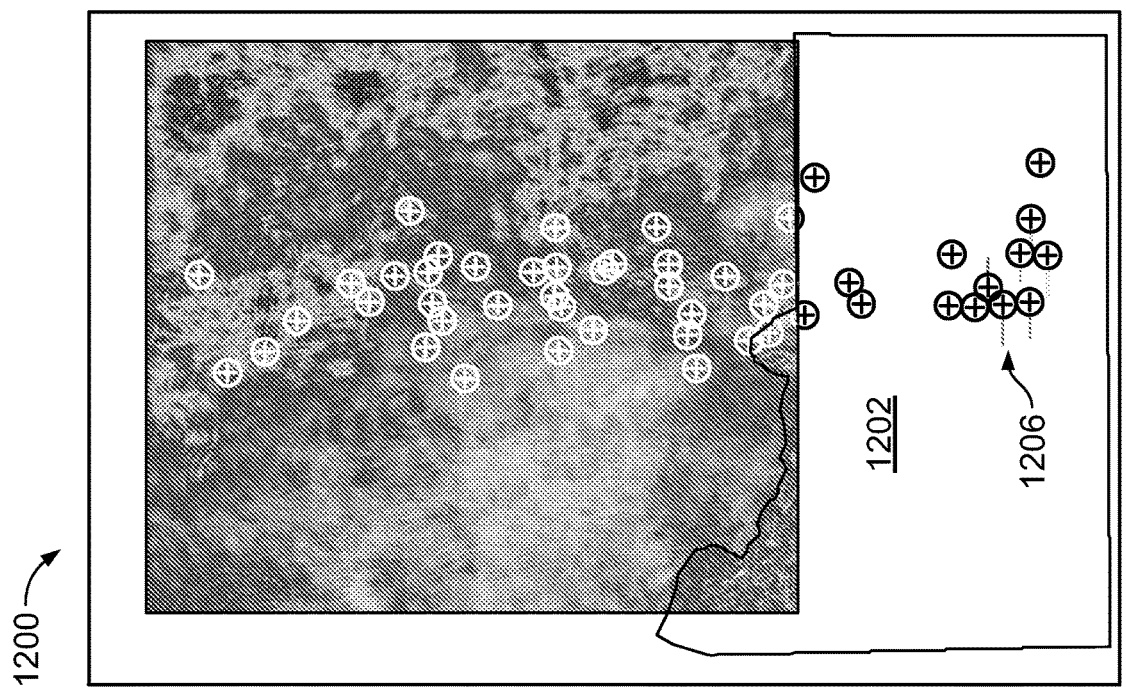

FIG. 12 shows images 1200, 1210 illustrating example data extrapolation for the acoustic impedance volume, such as volume 600 of FIG. 6B. As previously stated, the data processing system 500 is configured to extrapolate (412) the acoustic impedance into areas with no seismic coverage. Region 1202 lacks seismic data in image 1200. In image 1210, the region 1204 includes acoustic impedance data generated from wells 1206.

The extrapolation process is extended to extrapolate the acoustic impedance into the areas 1202 with no seismic coverage or low-quality seismic data due to the effect of soft sediments as seismic waves entering sediment-filled valleys (wadi areas), which can trap seismic energy.

Figure 13:
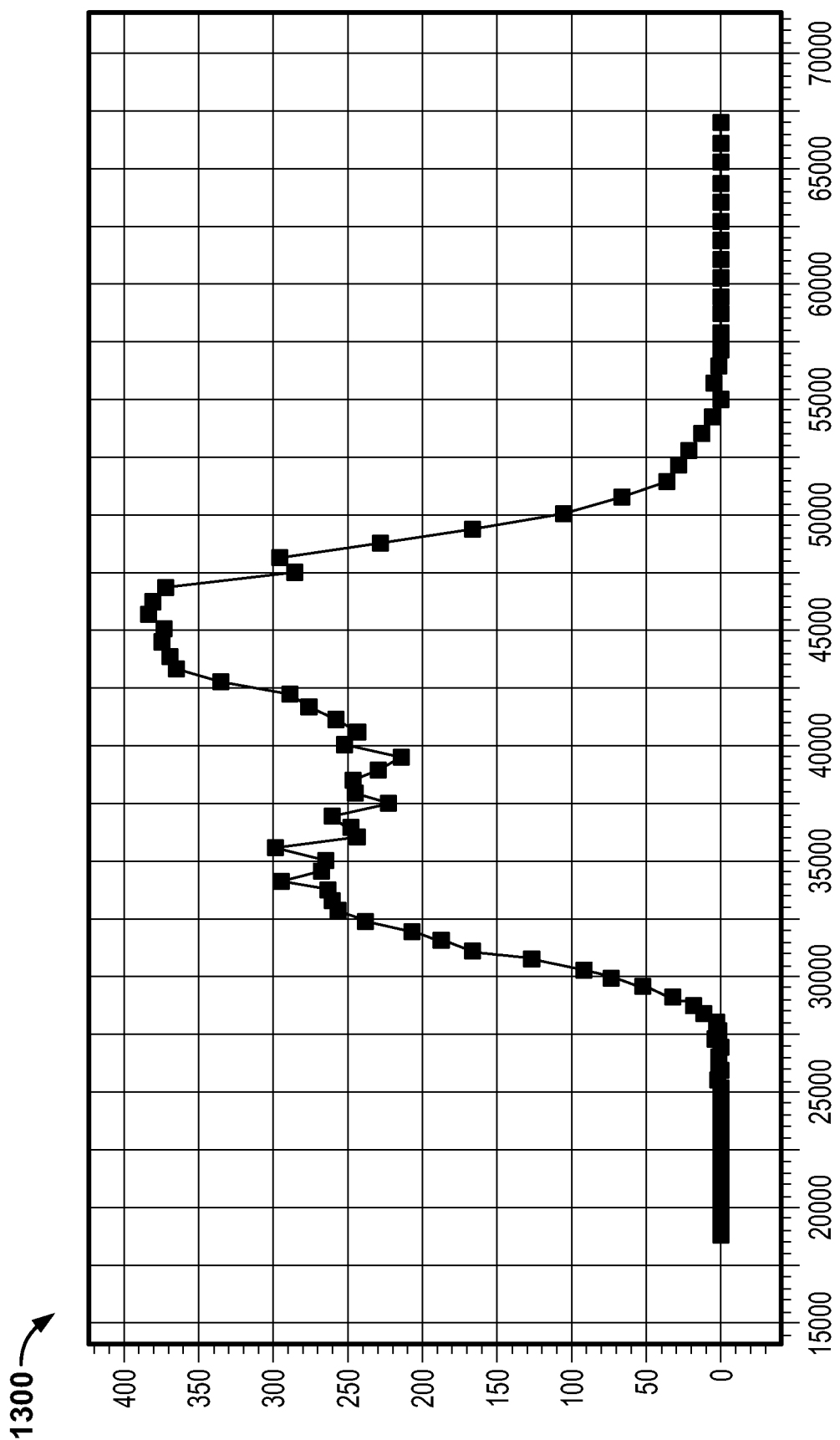
FIG. 13 shows a graph of an example probability distribution.

FIG. 13 shows a graph 1300 of an example probability distribution. The data processing system 500 uses a probability distribution function, such as the distribution in graph 1300, for extrapolation from well data. The data processing system combines well data from wells within a seismic coverage area and from wells in an area with no seismic data coverage. The data processing system 500, from, the combined data, reproduces extrapolates the impedance in the area with no seismic coverage.

The probability distribution function and well impedance data in the area with no seismic coverage together are an input for the sequential Gaussian simulation, which is a stochastic method of interpolation/extrapolation based on Kriging. This simulation uses these input data, an input distribution function, variograms data, and trends data to generate the extrapolation. A variogram includes a geostatistical tool that defines correlation ranges in coordinate directions of X, Y and Z between the well observation points represented by the well data (such as well data 706*a-h* of FIG. 7).

The data processing system 500 performs the transform based on each of the grid model cells (such as cell 904) in a random order for the area with no seismic coverage (such as area 1202 of FIG. 12). For each cell, the data processing system 500 performs kriging to determine a variance at that cell. The data processing system 500 then picks a value from the input distribution to match the variance at that cell. As subsequent cells are visited, the previously defined cell values are also used for the kriging (not just the input data).

Figure 14A:
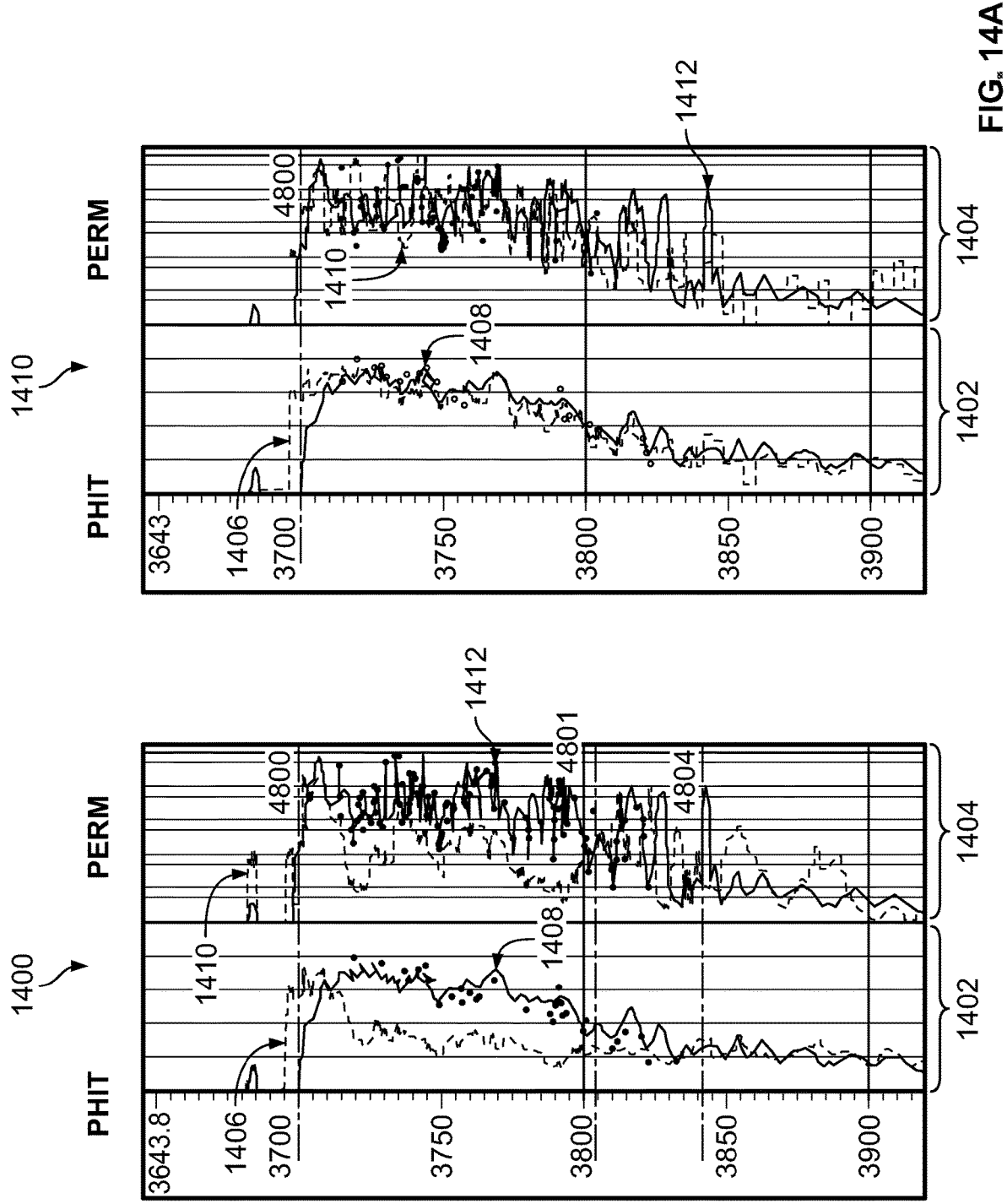
FIGS. 14A-14B each shows an image illustrating examples of porosity and permeability models.
Figure 14B:
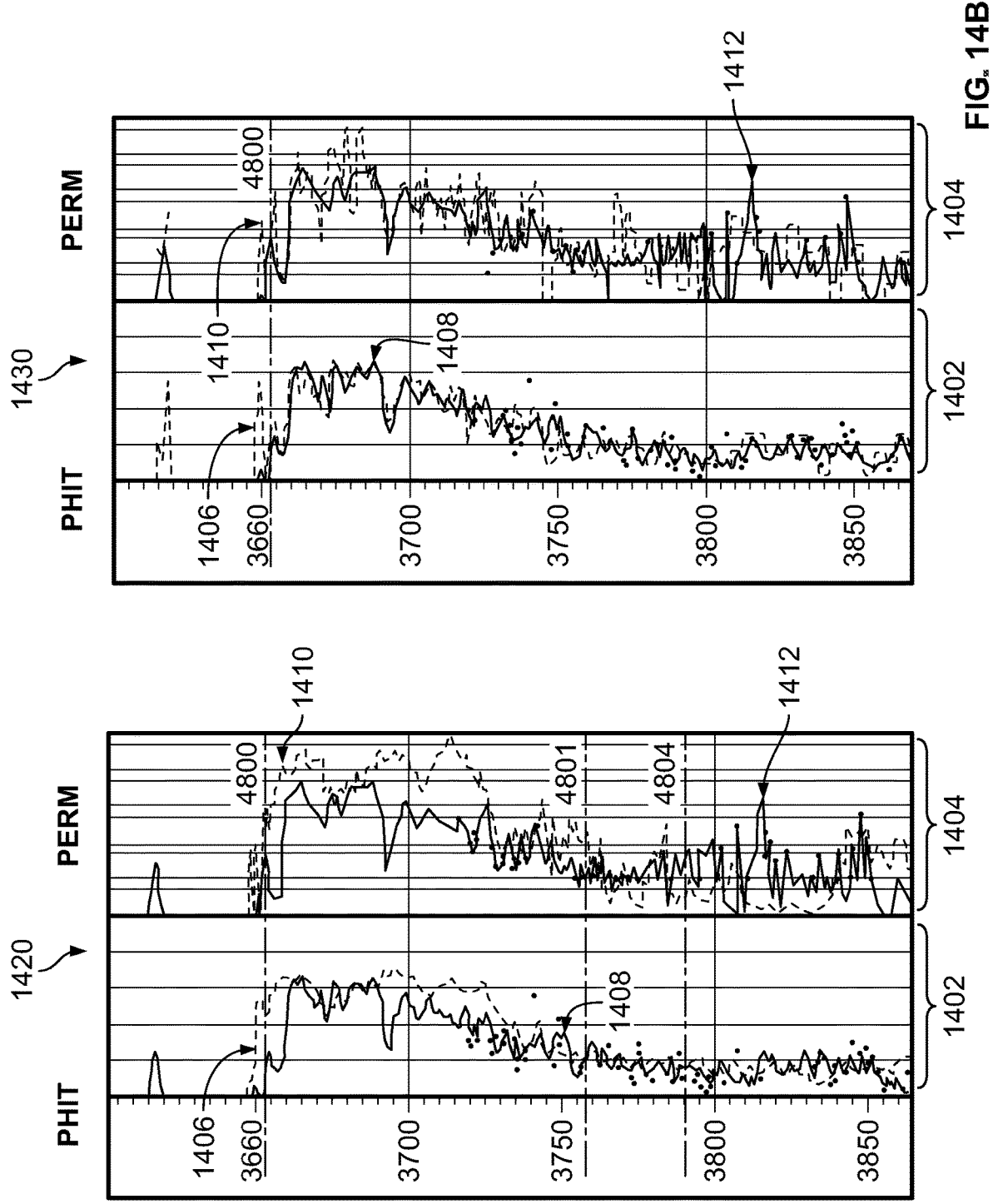

FIGS. 14A-14B each shows results data including porosity and permeability models. Model predictability is used as a measure of quality control for result data. Porosity and permeability model scenarios are generated, guided by seismic scale impedance and subject downscaled impedance. A blind test is performed for wells that used data far off well control data. The results 1410, 1430 for models 1402, 1404 guided by the downscaled inversion showed relatively good predictability for porosity and permeability compared to the results 1400, 1420 for models 1402, 1404 guided by seismic scale inversion. The data processing system 500 can predict thin (such as 1-5 foot thick) permeability streaks within the subsurface.

FIG. 14A shows first results 1400 for a porosity model 1402 and a permeability model 1404 when the models are guided by seismic scale inversion only. The models of results 1400 show poor predictability. The modeled porosity is shown by line 1406, and the actual data is shown as line 1408 in model 1402 of results 1400. Similarly, the modeled permeability 1410 of results 1400 shows poor results. The modeled permeability is shown by line 1410, while the actual permeability for the subsurface region is shown by line 1412 in model 1404 of results 1400.

The results 1410 are guided by downscaled inversion as described previously in relation to process 400. The results 1410 show a much closer prediction of porosity and permeability with respect to actual values. The modeled porosity is shown by line 1406, and the actual data are shown as line 1408 of model 1402 of results 1410. The modeled permeability is shown by line 1410, and the actual data are shown as line 1412 of model 1404 of results 1410.

FIG. 14B shows a second instance of results data showing a comparison between results 1420 and results 1430. The permeability and porosity results 1420 are guided by seismic scale inversion only, while the permeability and porosity results 1430 are guided by downscaled inversion data as described previously in relation to process 400. The models of results 1420 show poor predictability. The modeled porosity is shown by line 1406, and the actual data is shown as line 1408 in model 1402 of results 1420. Similarly, the modeled permeability 1410 of results 1400 shows poor results. The modeled permeability is shown by line 1410, while the actual permeability for the subsurface region is shown by line 1412 in model 1404 of results 1420.

The results 1430 are guided by downscaled inversion as described previously in relation to process 400. The results 1430 show a much closer prediction of porosity and permeability with respect to actual values. The modeled porosity is shown by line 1406, and the actual data are shown as line 1408 of model 1402 of results 1410. The modeled permeability is shown by line 1410, and the actual data are shown as line 1412 of model 1404 of results 1430.

Figure 15:
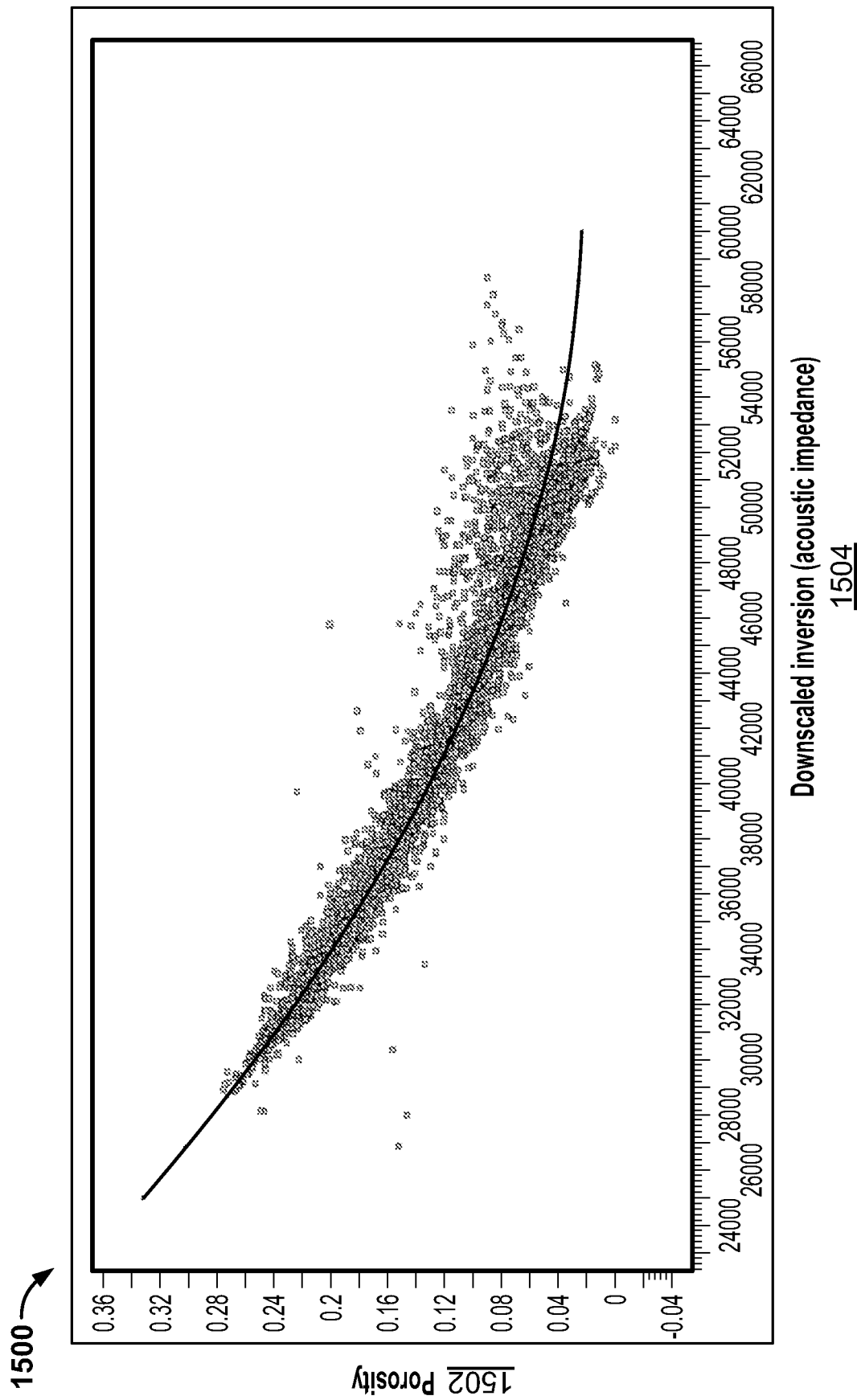
FIG. 15 shows a graph illustrating an example of a relationship between acoustic impedance and porosity.

The downscaled inversion improves the porosity model and the permeability model because the downscaled inversion captures far more vertical and lateral details compared to the inversion at seismic scale. The porosity and permeability models based on downscaled inversion provide a different lateral distribution for each grid layer (1-5-foot resolution). The inversion at the seismic scale gives the same image with a lateral distribution for an interval of 25-30 feet. The models based on downscaled inversion capture more vertical and lateral details compared to seismic scale inversion. The models based on downscaled inversion enhance a quality and predictability of porosity models when it is specified as co-simulation parameter to guide the result of the modeled petrophysical parameter of porosity. The porosity is accordingly specified as co-simulation parameter to guide the result of the modeled petrophysical parameter of permeability. The acoustic impedance is the product of seismic velocity and density. For a higher the rock density or impedance value there is a porosity (and vice versa). This is used as a trend and/or co-located simulation parameter in order to guide the porosity distribution in 3D space. This relationship is shown in graph 1500 of FIG. 15. FIG. 15 shows a graph 1500 illustrating an example of a relationship between acoustic impedance 1504 and porosity 1502.

Figure 16:
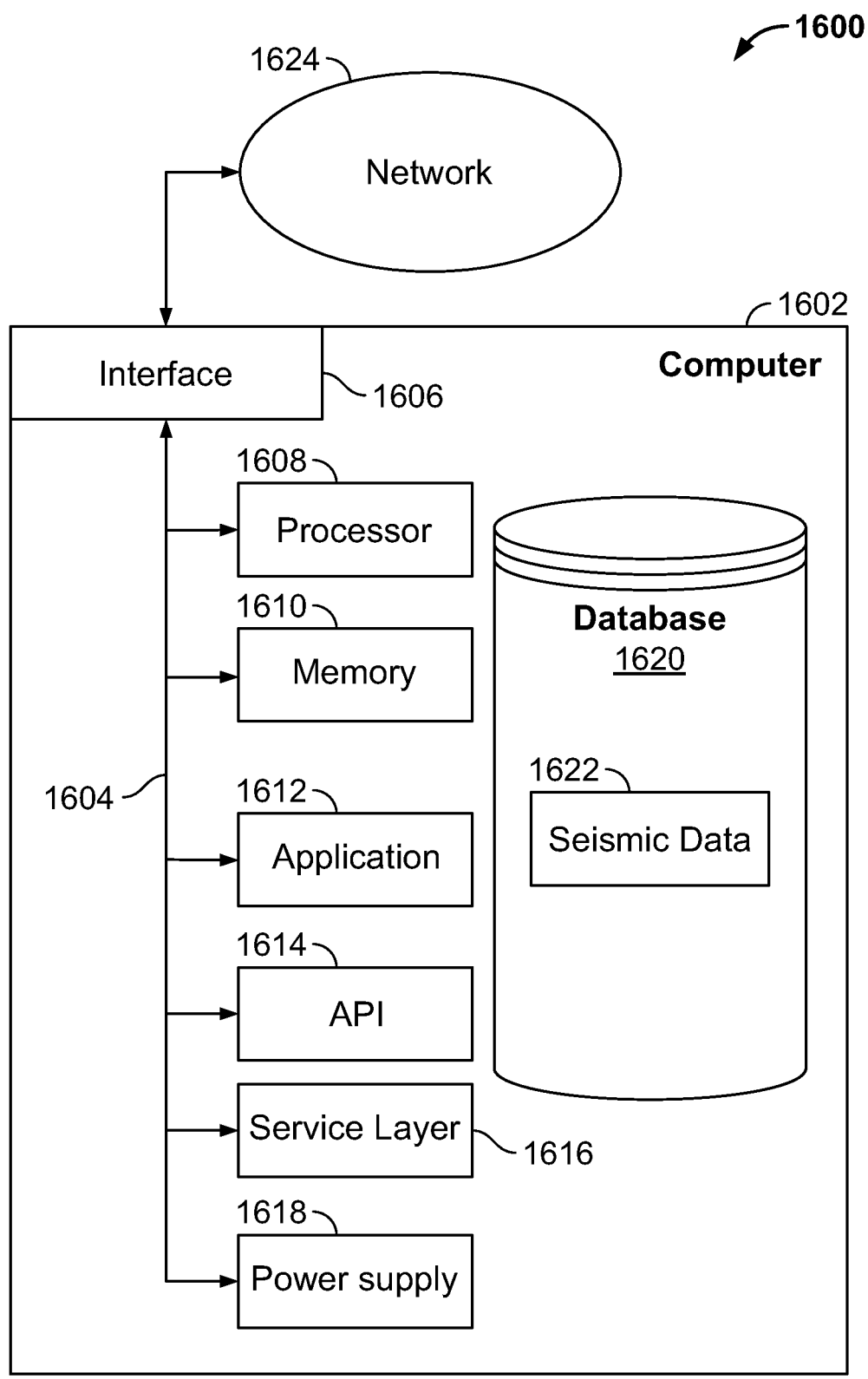
FIG. 16 is a diagram of an example computing system.

FIG. 16 is a block diagram of an example computing system 1600 used to provide computational functionalities associated with described algorithms, methods, functions, processes, flows, and procedures described in the present disclosure, according to some implementations of the present disclosure. The illustrated computer 1602 is intended to encompass any computing device such as a server, a desktop computer, a laptop/notebook computer, a wireless data port, a smart phone, a personal data assistant (PDA), a tablet computing device, or one or more processors within these devices, including physical instances, virtual instances, or both. The computer 1602 can include input devices such as keypads, keyboards, and touch screens that can accept user information. Also, the computer 1602 can include output devices that can convey information associated with the operation of the computer 1602. The information can include digital data, visual data, audio information, or a combination of information. The information can be presented in a graphical user interface (UI) (or GUI).

The computer 1602 can serve in a role as a client, a network component, a server, a database, a persistency, or components of a computer system for performing the subject matter described in the present disclosure. The illustrated computer 1602 is communicably coupled with a network 1624. In some implementations, one or more components of the computer 1602 can be configured to operate within different environments, including cloud-computing-based environments, local environments, global environments, and combinations of environments.

At a high level, the computer 1602 is an electronic computing device operable to receive, transmit, process, store, and manage data and information associated with the described subject matter. According to some implementations, the computer 1602 can also include, or be communicably coupled with, an application server, an email server, a web server, a caching server, a streaming data server, or a combination of servers.

The computer 1602 can receive requests over network 1624 from a client application (for example, executing on another computer 1602). The computer 1602 can respond to the received requests by processing the received requests using software applications. Requests can also be sent to the computer 1602 from internal users (for example, from a command console), external (or third) parties, automated applications, entities, individuals, systems, and computers.

Each of the components of the computer 1602 can communicate using a system bus 1604. In some implementations, any or all of the components of the computer 1602, including hardware or software components, can interface with each other or the interface 1606 (or a combination of both), over the system bus 1604. Interfaces can use an application programming interface (API) 1614, a service layer 1616, or a combination of the API 1614 and service layer 1616. The API 1614 can include specifications for routines, data structures, and object classes. The API 1614 can be either computer-language independent or dependent. The API 1614 can refer to a complete interface, a single function, or a set of APIs.

The service layer 1616 can provide software services to the computer 1602 and other components (whether illustrated or not) that are communicably coupled to the computer 1602. The functionality of the computer 1602 can be accessible for all service consumers using this service layer. Software services, such as those provided by the service layer 1616, can provide reusable, defined functionalities through a defined interface. For example, the interface can be software written in JAVA, C++, or a language providing data in extensible markup language (XML) format. While illustrated as an integrated component of the computer 1602, in alternative implementations, the API 1614 or the service layer 1616 can be stand-alone components in relation to other components of the computer 1602 and other components communicably coupled to the computer 1602. Moreover, any or all parts of the API 1614 or the service layer 1616 can be implemented as child or sub-modules of another software module, enterprise application, or hardware module without departing from the scope of the present disclosure.

The computer 1602 includes an interface 1606. Although illustrated as a single interface 1606 in FIG. 16, two or more interfaces 1606 can be used according to particular needs, desires, or particular implementations of the computer 1602 and the described functionality. The interface 1606 can be used by the computer 1602 for communicating with other systems that are connected to the network 1624 (whether illustrated or not) in a distributed environment. Generally, the interface 1606 can include, or be implemented using, logic encoded in software or hardware (or a combination of software and hardware) operable to communicate with the network 1624. More specifically, the interface 1606 can include software supporting one or more communication protocols associated with communications. As such, the network 1624 or the hardware of the interface can be operable to communicate physical signals within and outside of the illustrated computer 1602.

The computer 1602 includes a processor 1608. Although illustrated as a single processor 1608 in FIG. 16, two or more processors 1608 can be used according to particular needs, desires, or particular implementations of the computer 1602 and the described functionality. Generally, the processor 1608 can execute instructions and can manipulate data to perform the operations of the computer 1602, including operations using algorithms, methods, functions, processes, flows, and procedures as described in the present disclosure.

The computer 1602 also includes a database 1620 that can hold data (for example, seismic data 1622) for the computer 1602 and other components connected to the network 1624 (whether illustrated or not). For example, database 1620 can be an in-memory, conventional, or a database storing data consistent with the present disclosure. In some implementations, database 1620 can be a combination of two or more different database types (for example, hybrid in-memory and conventional databases) according to particular needs, desires, or particular implementations of the computer 1602 and the described functionality. Although illustrated as a single database 1620 in FIG. 16, two or more databases (of the same, different, or combination of types) can be used according to particular needs, desires, or particular implementations of the computer 1602 and the described functionality. While database 1620 is illustrated as an internal component of the computer 1602, in alternative implementations, database 1620 can be external to the computer 1602.

The computer 1602 also includes a memory 1610 that can hold data for the computer 1602 or a combination of components connected to the network 1624 (whether illustrated or not). Memory 1610 can store any data consistent with the present disclosure. In some implementations, memory 1610 can be a combination of two or more different types of memory (for example, a combination of semiconductor and magnetic storage) according to particular needs, desires, or particular implementations of the computer 1602 and the described functionality. Although illustrated as a single memory 1610 in FIG. 16, two or more memories 1610 (of the same, different, or combination of types) can be used according to particular needs, desires, or particular implementations of the computer 1602 and the described functionality. While memory 1610 is illustrated as an internal component of the computer 1602, in alternative implementations, memory 1610 can be external to the computer 1602.

The application 1612 can be an algorithmic software engine providing functionality according to particular needs, desires, or particular implementations of the computer 1602 and the described functionality. For example, application 1612 can serve as one or more components, modules, or applications. Further, although illustrated as a single application 1612, the application 1612 can be implemented as multiple applications 1612 on the computer 1602. In addition, although illustrated as internal to the computer 1602, in alternative implementations, the application 1612 can be external to the computer 1602.

The computer 1602 can also include a power supply 1618. The power supply 1618 can include a rechargeable or non-rechargeable battery that can be configured to be either user- or non-user-replaceable. In some implementations, the power supply 1618 can include power-conversion and management circuits, including recharging, standby, and power management functionalities. In some implementations, the power-supply 1618 can include a power plug to allow the computer 1602 to be plugged into a wall socket or a power source to, for example, power the computer 1602 or recharge a rechargeable battery.

There can be any number of computers 1602 associated with, or external to, a computer system containing computer 1602, with each computer 1602 communicating over network 1624. Further, the terms "client," "user," and other appropriate terminology can be used interchangeably, as appropriate, without departing from the scope of the present disclosure. Moreover, the present disclosure contemplates that many users can use one computer 1602 and one user can use multiple computers 1602.

Implementations of the subject matter and the functional operations described in this specification can be implemented in digital electronic circuitry, in tangibly embodied computer software or firmware, in computer hardware, including the structures disclosed in this specification and their structural equivalents, or in combinations of one or more of them. Software implementations of the described subject matter can be implemented as one or more computer programs. Each computer program can include one or more modules of computer program instructions encoded on a tangible, non-transitory, computer-readable computer-storage medium for execution by, or to control the operation of, data processing apparatus. Alternatively, or additionally, the program instructions can be encoded in/on an artificially generated propagated signal. The example, the signal can be a machine-generated electrical, optical, or electromagnetic signal that is generated to encode information for transmission to suitable receiver apparatus for execution by a data processing apparatus. The computer-storage medium can be a machine-readable storage device, a machine-readable storage substrate, a random or serial access memory device, or a combination of computer-storage mediums.

Computer readable media (transitory or non-transitory, as appropriate) suitable for storing computer program instructions and data can include all forms of permanent/non-permanent and volatile/non-volatile memory, media, and memory devices. Computer readable media can include, for example, semiconductor memory devices such as random-access memory (RAM), read only memory (ROM), phase change memory (PRAM), static random-access memory (SRAM), dynamic random-access memory (DRAM), erasable programmable read-only memory (EPROM), electrically erasable programmable read-only memory (EEPROM), and flash memory devices. Computer readable media can also include, for example, magnetic devices such as tape, cartridges, cassettes, and internal/removable disks. Computer readable media can also include magneto optical disks and optical memory devices and technologies including, for example, digital video disc (DVD), CD ROM, DVD+/−R, DVD-RAM, DVD-ROM, HD-DVD, and BLU-RAY. The memory can store various objects or data, including caches, classes, frameworks, applications, modules, backup data, jobs, web pages, web page templates, data structures, database tables, repositories, and dynamic information. Types of objects and data stored in memory can include parameters, variables, algorithms, instructions, rules, constraints, and references. Additionally, the memory can include logs, policies, security or access data, and reporting files. The processor and the memory can be supplemented by, or incorporated in, special purpose logic circuitry.

Any claimed implementation is considered to be applicable to at least a computer-implemented method; a non-transitory, computer-readable medium storing computer-readable instructions to perform the computer-implemented method; and a computer system comprising a computer memory interoperable coupled with a hardware processor configured to perform the computer-implemented method or the instructions stored on the non-transitory, computer-readable medium.

While this specification contains many specific implementation details, these should not be construed as limitations on the scope of what may be claimed, but rather as descriptions of features that may be specific to particular implementations. Certain features that are described in this specification in the context of separate implementations can also be implemented, in combination, in a single implementation. Conversely, various features that are described in the context of a single implementation can also be implemented in multiple implementations, separately, or in any suitable sub-combination. Moreover, although previously described features may be described as acting in certain combinations and even initially claimed as such, one or more features from a claimed combination can, in some cases, be excised from the combination, and the claimed combination may be directed to a sub-combination or variation of a sub-combination.

What is claimed is:

1. A method for seismic imaging of a subterranean geological formation, the method comprising:
   receiving well logs including first acoustic impedance data associated with one or more wells in a subsurface region including the subterranean geological formation, the first acoustic impedance data having a first resolution;
   receiving seismic data, the seismic data including second acoustic impedance data having a second resolution that is different than the first resolution;
   performing a quality control process configured to identify a mismatch between the first acoustic impedance data and the second acoustic impedance data when the mismatch is present;
   resampling the second acoustic impedance data into a three-dimensional (3D) grid model that includes the subsurface region;
   scaling up the first acoustic impedance data into the 3D grid model;
   downscaling the second acoustic impedance data controlled by the first acoustic impedance data in the 3D grid model;
   generating, based on the first acoustic impedance data that is scaled up and the second acoustic impedance data that is downscaled in the 3D grid model, third acoustic impedance data representing fine-scale impedance data for one or more areas in the subsurface;
   extrapolating the fine-scale impedance into areas or regions having no seismic data coverage or lower quality seismic data coverage relative to a region or area having a higher-quality seismic data coverage; and
   rendering, for an area or region having no seismic coverage or lower quality seismic data coverage, an image representing a subsurface of the area or the region.

2. The method of claim 1, further comprising drilling a well based on the third acoustic impedance data.

3. The method of claim 1, wherein downscaling the second acoustic impedance data guided and controlled by the first acoustic impedance data in the 3D grid model comprises applying a sequential Gaussian simulation and a co-located simulation with optimal seismic scale impedance to the first acoustic impedance data and the second acoustic impedance data.

4. The method of claim 1, further comprising performing a trend quality control process on the second acoustic impedance data by performing operations comprising;
   extracting syncretic logs at a well level for a reservoir interval;
   comparing, over the reservoir interval, data of the syncretic logs at the well level to the first acoustic impedance data; and
   determining that a first one-dimensional (1D) trend of the data of the syncretic logs of the second acoustic impedance data comports with a second 1D trend of the first acoustic impedance data.

5. The method of claim 1, wherein resampling comprises transforming values from the second acoustic impedance data on a nearest node basis into the 3D grid model.

6. The method of claim 1, wherein the first resolution is 0.5 feet to 1 foot corresponding to a log data resolution, and wherein the second resolution is 25-30 feet, corresponding to a seismic data resolution.

7. The method of claim 1, further comprising rendering, based on the third acoustic impedance data, a seismic image for presentation on a user interface.

8. The method of claim 1, wherein scaling up the first acoustic impedance data into the 3D grid model comprises a cell-based averaging of the first acoustic impedance data.

9. A system for seismic imaging of a subterranean geological formation, the system comprising:
- at least one processor; and
- a memory storing instructions that, when executed by the at least one processor, cause the at least one processor to perform operations comprising:
    - receiving well logs including first acoustic impedance data associated with one or more wells in a subsurface region including the subterranean geological formation, the first acoustic impedance data having a first resolution;
    - receiving seismic data, the seismic data including second acoustic impedance data having a second resolution that is different than the first resolution;
    - performing a quality control process configured to identify a mismatch between the first acoustic impedance data and the second acoustic impedance data when the mismatch is present;
    - resampling the second acoustic impedance data into a three-dimensional (3D) grid model that includes the subsurface region;
    - scaling up the first acoustic impedance data into the 3D grid model;
    - downscaling the second acoustic impedance data controlled by the first acoustic impedance data in the 3D grid model;
    - generating, based on the first acoustic impedance data that is scaled up and the second acoustic impedance data that is downscaled in the 3D grid model, third acoustic impedance data representing fine-scale impedance data for one or more areas in the subsurface;
    - extrapolating the fine-scale impedance into areas or regions having no seismic data coverage or lower quality seismic data coverage relative to a region or area having a higher-quality seismic data coverage; and
    - rendering, for an area or region having no seismic coverage or lower quality seismic data coverage, an image representing a subsurface of the area or the region.

10. The system of claim 9, the operations further comprising drilling a well based on the third acoustic impedance data.

11. The system of claim 9, wherein downscaling the second acoustic impedance data guided and controlled by the first acoustic impedance data in the 3D grid model comprises applying a sequential Gaussian simulation and a co-located simulation with optimal seismic scale impedance to the first acoustic impedance data and the second acoustic impedance data.

12. The system of claim 9, the operations further comprising:
- performing a trend quality control process on the second acoustic impedance data by performing operations comprising:
    - extracting syncretic logs at a well level for a reservoir interval;
    - comparing, over the reservoir interval, data of the syncretic logs at the well level to the first acoustic impedance data; and
    - determining that a first one-dimensional (1D) trend of the data of the syncretic logs of the second acoustic impedance data comports with a second 1D trend of the first acoustic impedance data.

13. The system of claim 9, wherein resampling comprises transforming values from the second acoustic impedance data on a nearest node basis into the 3D grid model.

14. The system of claim 9, wherein the first resolution is 0.5 feet to 1 foot corresponding to a log data resolution, and wherein the second resolution is 25-30 feet, corresponding to a seismic data resolution.

15. The system of claim 9, the operations further comprising rendering, based on the third acoustic impedance data, a seismic image for presentation on a user interface.

16. The system of claim 9, wherein scaling up the first acoustic impedance data into the 3D grid model comprises a cell-based averaging of the first acoustic impedance data.

17. One or more non-transitory computer-readable media storing instructions for seismic imaging of a subterranean geological formation, the instructions, when executed by at least one processor, cause the at least one processor to perform operations comprising:
- receiving well logs including first acoustic impedance data associated with one or more wells in a subsurface region including the subterranean geological formation, the first acoustic impedance data having a first resolution;
- receiving seismic data, the seismic data including second acoustic impedance data having a second resolution that is different than the first resolution;
- performing a quality control process configured to identify a mismatch between the first acoustic impedance data and the second acoustic impedance data when the mismatch is present;
- resampling the second acoustic impedance data into a three-dimensional (3D) grid model that includes the subsurface region;
- scaling up the first acoustic impedance data into the 3D grid model;
- downscaling the second acoustic impedance data controlled by the first acoustic impedance data in the 3D grid model;
- generating, based on the first acoustic impedance data that is scaled up and the second acoustic impedance data that is downscaled in the 3D grid model, third acoustic impedance data representing fine-scale impedance data for one or more areas in the subsurface;
- extrapolating the fine-scale impedance into areas or regions having no seismic data coverage or lower quality seismic data coverage relative to a region or area having a higher-quality seismic data coverage; and
- rendering, for an area or region having no seismic coverage or lower quality seismic data coverage, an image representing a subsurface of the area or the region.

18. The one or more non-transitory computer-readable media of claim 17, further comprising drilling a well based on the third acoustic impedance data.

19. The one or more non-transitory computer-readable media of claim 17, wherein downscaling the second acoustic impedance data guided and controlled by the first acoustic impedance data in the 3D grid model comprises applying a sequential Gaussian simulation and a co-located simulation with optimal seismic scale impedance to the first acoustic impedance data and the second acoustic impedance data.

20. The one or more non-transitory computer-readable media of claim 17, the operations further comprising:
- performing a trend quality control process on the second acoustic impedance data by performing operations comprising:

extracting syncretic logs at a well level for a reservoir interval;

comparing, over the reservoir interval, data of the syncretic logs at the well level to the first acoustic impedance data; and determining that a first one-dimensional (1D) trend of the data of the syncretic logs of the second acoustic impedance data comports with a second ID trend of the first acoustic impedance data.

\* \* \* \* \*